United States Patent

Hirakata et al.

(10) Patent No.: US 10,155,368 B2
(45) Date of Patent: Dec. 18, 2018

(54) SEPARATION METHOD AND SEPARATION APPARATUS

(71) Applicant: Semiconductor Energy Laboratory Co., Ltd., Kanagawa-ken (JP)

(72) Inventors: Yoshiharu Hirakata, Kanagawa (JP); Akihiro Chida, Kanagawa (JP); Kohei Yokoyama, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1130 days.

(21) Appl. No.: 14/270,676

(22) Filed: May 6, 2014

(65) Prior Publication Data

US 2014/0332150 A1    Nov. 13, 2014

(30) Foreign Application Priority Data

May 7, 2013    (JP) .................. 2013-097245

(51) Int. Cl.
*B32B 38/10* (2006.01)
*B32B 43/00* (2006.01)
*B32B 38/18* (2006.01)
*B32B 41/00* (2006.01)

(52) U.S. Cl.
CPC ............ *B32B 38/10* (2013.01); *B32B 43/006* (2013.01); *B32B 38/1858* (2013.01); *B32B 41/00* (2013.01); *Y10T 156/1944* (2015.01)

(58) Field of Classification Search
CPC ....... B32B 38/10; B32B 43/006; B32B 41/00; B32B 38/1858; Y10T 156/1944
See application file for complete search history.

(56) References Cited

U.S. PATENT DOCUMENTS

| 6,913,985 B2 | 7/2005 | Ogihara et al. |
| 7,067,392 B2 | 6/2006 | Yamazaki et al. |
| 7,122,445 B2 | 10/2006 | Takayama et al. |
| 7,229,900 B2 | 6/2007 | Takayama et al. |

(Continued)

FOREIGN PATENT DOCUMENTS

| JP | 2003-517217 | 5/2003 |
| JP | 2005-051117 A | 2/2005 |

(Continued)

*Primary Examiner* — Michael N Orlando
*Assistant Examiner* — Cynthia L Schaller
(74) *Attorney, Agent, or Firm* — Husch Blackwell LLP

(57) ABSTRACT

A method and an apparatus for manufacturing an object which involve a separation technique are provided. A first substrate provided with an object is attached to a second substrate and is then suction-fixed by using a suction chuck (also referred to as a suction stage or a vacuum chuck) including portions with different suction capabilities or by using its functional equivalent, and the second substrate is separated from the first substrate. Accordingly, the object is separated from the first substrate and transferred to the second substrate. An apparatus for achieving this is also provided. A substrate fixture surface of the suction chuck or its functional equivalent includes a plurality of portions provided with suction micro-holes and a portion provided with no holes. Owing to the plurality of portions provided with suction micro-holes, a plurality of objects can be transferred from the first substrate to the second substrate.

25 Claims, 18 Drawing Sheets

(56) References Cited

U.S. PATENT DOCUMENTS

| | | |
|---|---|---|
| 7,241,666 B2 | 7/2007 | Goto et al. |
| 7,245,331 B2 | 7/2007 | Yamazaki et al. |
| 7,262,088 B2 | 8/2007 | Kodaira et al. |
| 7,307,006 B2 | 12/2007 | Okazaki et al. |
| 7,368,030 B2 | 5/2008 | Jaussaud et al. |
| 7,452,786 B2 | 11/2008 | Dozen et al. |
| 7,456,059 B2 | 11/2008 | Kodaira et al. |
| 7,456,104 B2 | 11/2008 | Kusumoto et al. |
| 7,465,596 B2 | 12/2008 | Tsurume et al. |
| 7,510,950 B2 | 3/2009 | Tsurume et al. |
| 7,591,863 B2 | 9/2009 | Watanabe et al. |
| 7,632,740 B2 | 12/2009 | Aoki et al. |
| 7,723,842 B2 | 5/2010 | Tsurume et al. |
| 7,820,526 B2 | 10/2010 | Yamada et al. |
| 7,927,971 B2 | 4/2011 | Tamura et al. |
| 7,972,910 B2 | 7/2011 | Dairiki et al. |
| 8,048,777 B2 | 11/2011 | Eguchi et al. |
| 8,367,440 B2 | 2/2013 | Takayama et al. |
| 8,409,973 B2 | 4/2013 | Chida et al. |
| 8,415,208 B2 | 4/2013 | Takayama et al. |
| 8,507,322 B2 | 8/2013 | Chida et al. |
| 8,609,464 B2 | 12/2013 | Oikawa et al. |
| 8,698,262 B2 | 4/2014 | Tsurume et al. |
| 2003/0047289 A1* | 3/2003 | Jaussaud ............. H01L 21/6838 156/758 |
| 2004/0259331 A1* | 12/2004 | Ogihara ............. H01L 21/2007 438/462 |
| 2013/0344681 A1 | 12/2013 | Chida et al. |
| 2014/0306260 A1 | 10/2014 | Yamazaki et al. |

FOREIGN PATENT DOCUMENTS

| | | |
|---|---|---|
| JP | 2007-311590 A | 11/2007 |
| JP | 2012-215737 A | 11/2012 |

\* cited by examiner

To Vacuum Pump

SEPARATION METHOD AND SEPARATION APPARATUS

BACKGROUND OF THE INVENTION

1. Field of the Invention

The present invention relates to a method and an apparatus for manufacturing an object which involve a separation technique.

2. Description of the Related Art

There are known techniques for separating and transferring a film-like object formed over one substrate to another substrate (for example, Patent Document 1).

In manufacture of electronic devices using semiconductor and insulating thin films, it is desired that electronic devices are formed over a large-sized substrate because an increase in substrate size can reduce manufacturing cost. On the other hand, since the size of each electronic device is much smaller than that of the substrate, objects formed over the substrate need to be cut into a necessary size at some point.

PATENT DOCUMENT

[Patent Document 1] U.S. Pat. No. 7,067,392

SUMMARY OF THE INVENTION

This disclosure provides a method and an apparatus for manufacturing an object which involve a separation technique.

A first substrate provided with an object is attached to a second substrate, and is divided into a necessary size or shape. The first substrate is then suction-fixed by using a suction chuck (also referred to as a suction stage or a vacuum chuck) including portions with different suction capabilities or by using its functional equivalent, and the second substrate is separated from the first substrate. Accordingly, the object is separated from the first substrate and transferred to the second substrate.

Yield and/or productivity can be improved.

DETAILED DESCRIPTION OF THE INVENTION

Figure 1A:
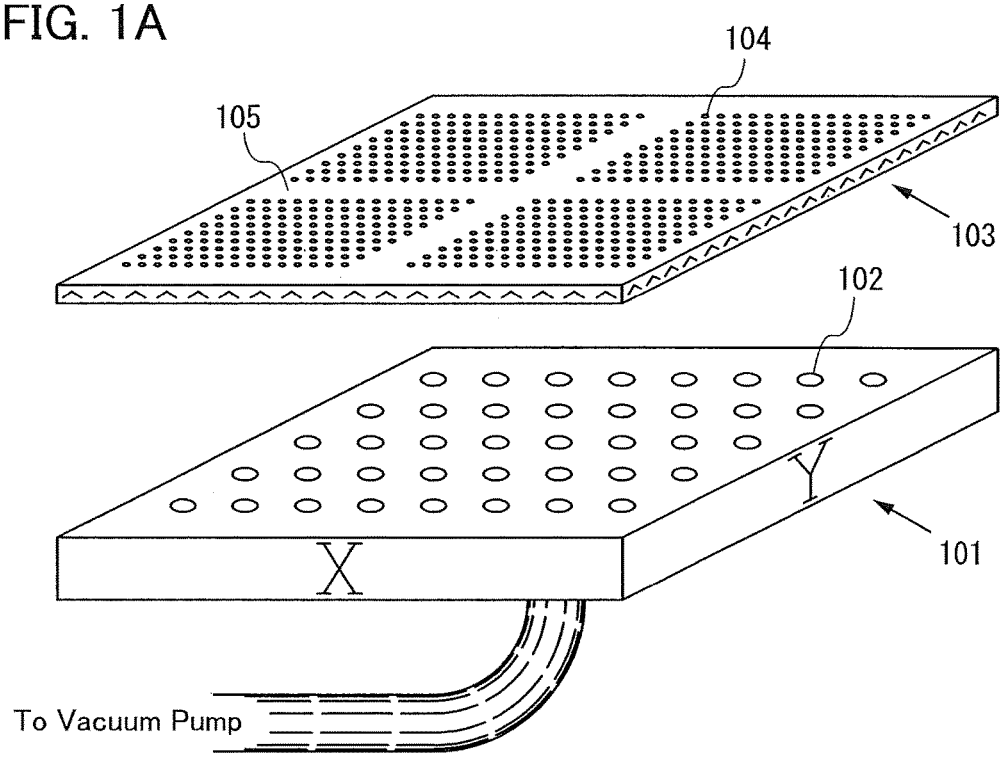
FIGS. 1A and 1B illustrate an example of a suction chuck and a substrate holder.

Embodiments of the present invention will be described in detail below with reference to drawings. Note that the present invention is not limited to the description below, and it is easily understood by those skilled in the art that modes and details disclosed herein can be modified in various ways. Further, the present invention is not construed as being limited to description of the embodiments. Note that, in the description of modes of the present invention with reference to the drawings, the same components in different diagrams are commonly denoted by the same reference numeral. Note that the same hatch pattern is applied to similar parts, and the similar parts are not especially denoted by reference numerals in some cases.

Note that ordinal numbers such as "first" and "second" are used for convenience and do not denote the order of steps or the stacking order of layers. Therefore, for example, description can be made even when "first" is replaced with "second" or "third", as appropriate. In addition, the ordinal numbers in this specification are not necessarily the same as the ordinal numbers used to specify one embodiment of the present invention.

Embodiment 1

Figure 1B:
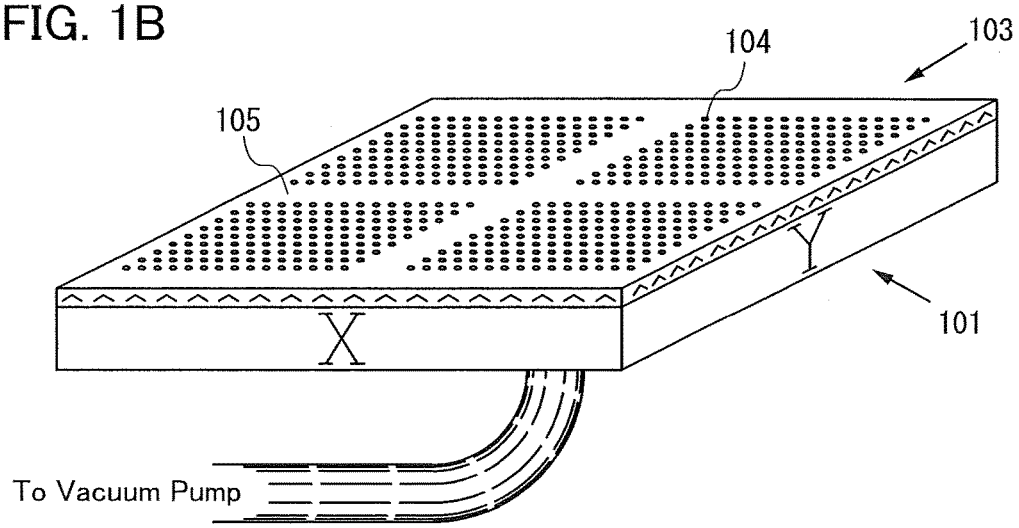

FIGS. 1A and 1B illustrate an example of an apparatus for fixing a substrate. An example in which a substrate holder 103 used for processing is fixed to a suction chuck 101 is described here. The suction chuck 101 may be a commercially available product.

As illustrated in FIG. 1A, the suction chuck 101 has a large number of suction holes 102 and is configured such that air suctioned through the suction holes 102 is evacuated with an evacuation unit such as a vacuum pump. An object placed close to the suction holes 102 is suction-fixed to the suction chuck 101.

The substrate holder 103 has a substrate fixture surface provided with suction micro-holes 104. Each of the suction micro-holes 104 can be sufficiently small, for example, greater than or equal to 20 µm and less than or equal to 200 µm. The substrate fixture surface also includes a portion 105 provided with no holes. For example, in the case where a portion provided with holes includes a square of side length L provided with at least four suction micro-holes 104, the portion 105 provided with no holes is a group of squares of side length L. In one example, four or more squares of side length L may fit in the portion 105 provided with no holes, and in another example, 100 or more squares of side length L may fit in the portion 105 provided with no holes.

As illustrated in FIG. 1B, the substrate holder 103 is fixed to the suction chuck 101. The substrate holder 103 may be fixed mechanically using fixing devices, screws, or the like or may be fixed using a suction force of the suction chuck 101.

Figure 2A:
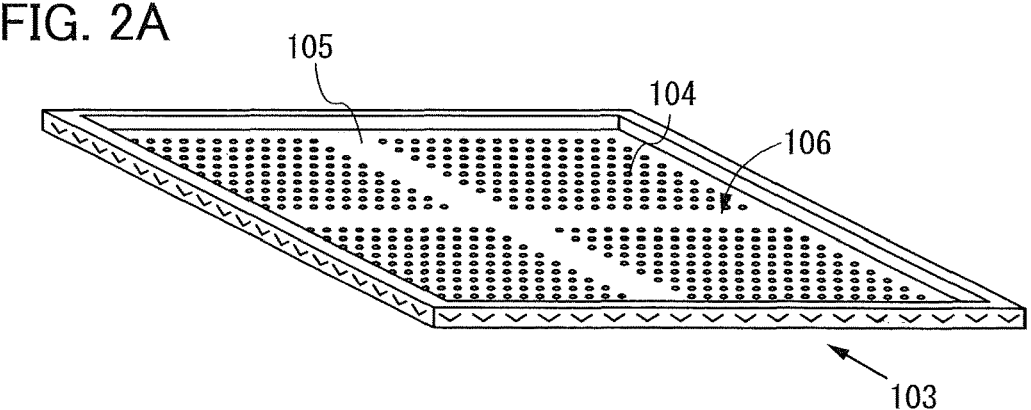
FIGS. 2A to 2C illustrate examples of substrate holders.

One example of a back side of the substrate fixture surface of the substrate holder 103 is illustrated in FIG. 2A. In this example, the back side of the substrate fixture surface has a depressed portion 106. Therefore, when the substrate holder 103 is fixed to the suction chuck 101, a space is provided between the substrate holder 103 and the suction chuck 101. At that time, the space between the substrate holder 103 and the suction chuck 101 is closely sealed, and air is suctioned through the suction micro-holes 104 to the suction chuck 101.

Figure 2B:
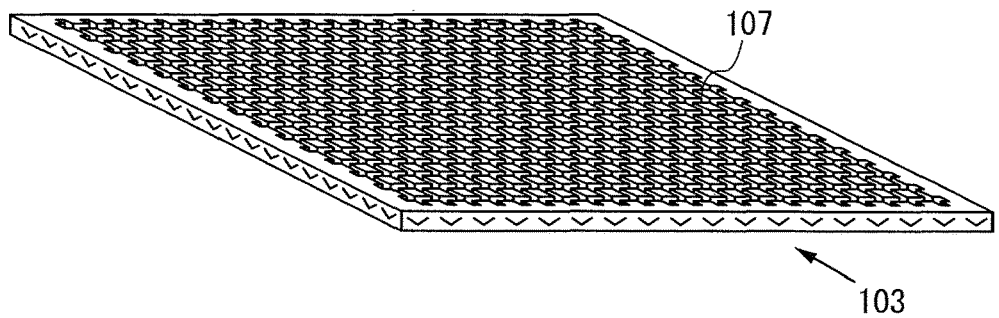
Figure 2C:
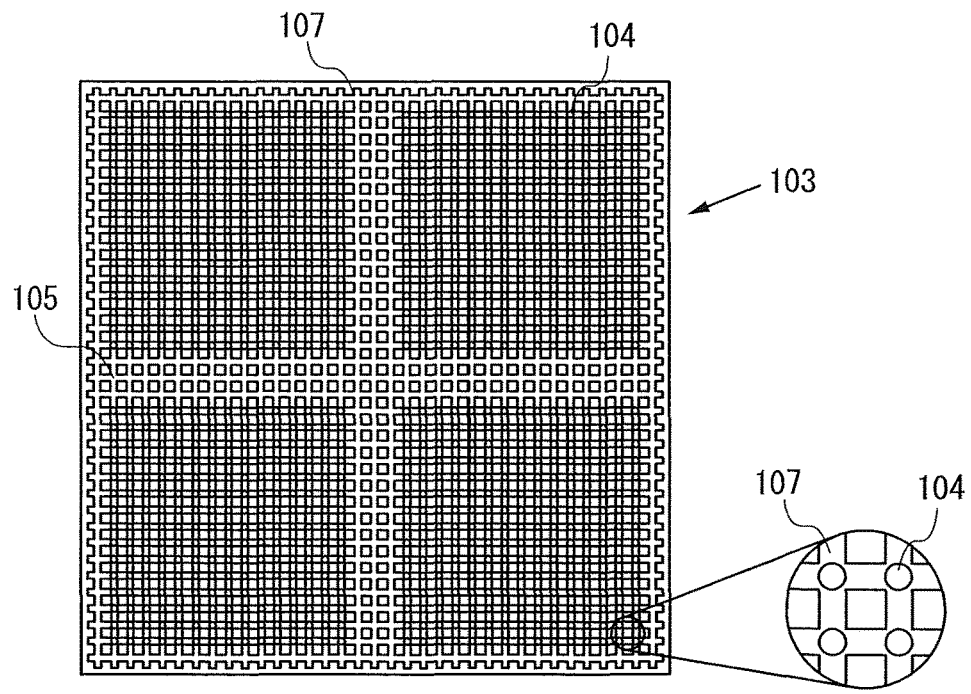

In another example, the back side of the substrate fixture surface of the substrate holder 103 has a structure with crossing grooves 107 as illustrated in FIG. 2B. A top view of the substrate holder 103 illustrated in FIG. 2B is illustrated in FIG. 2C. The suction micro-holes 104 are provided in the grooves 107. Also in this case, as in the case of FIG. 2A, the space between the substrate holder 103 and the suction chuck 101 is closely sealed, and air is suctioned through the suction micro-holes 104 to the suction chuck 101.

Note that the substrate fixture surface of the substrate holder 103 includes portions provided with the suction micro-holes 104 and the portion 105 provided with no holes. In the portions provided with the suction micro-holes 104, the suction force is stronger.

Figure 3A:
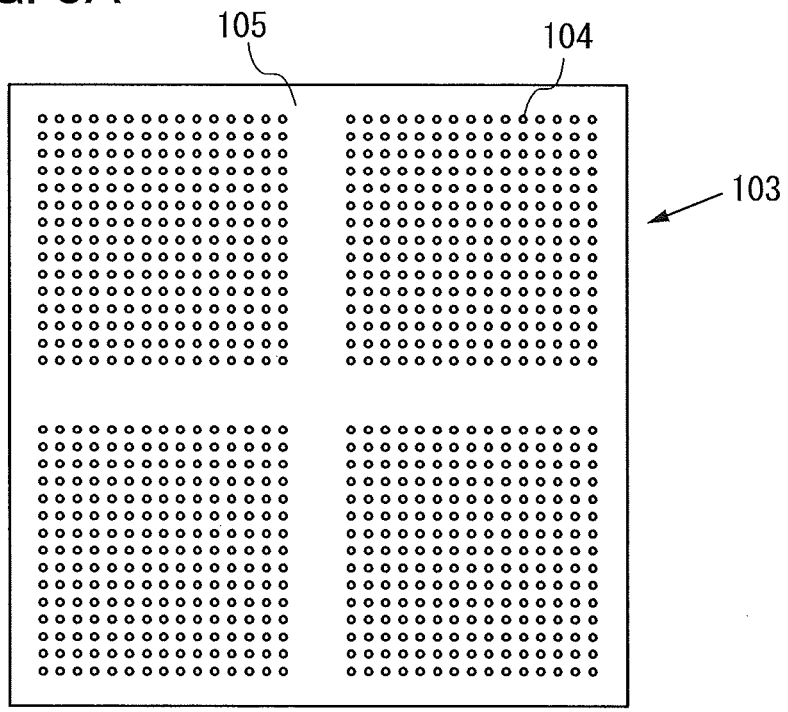
FIGS. 3A and 3B illustrate examples of substrate holders.
Figure 3B:
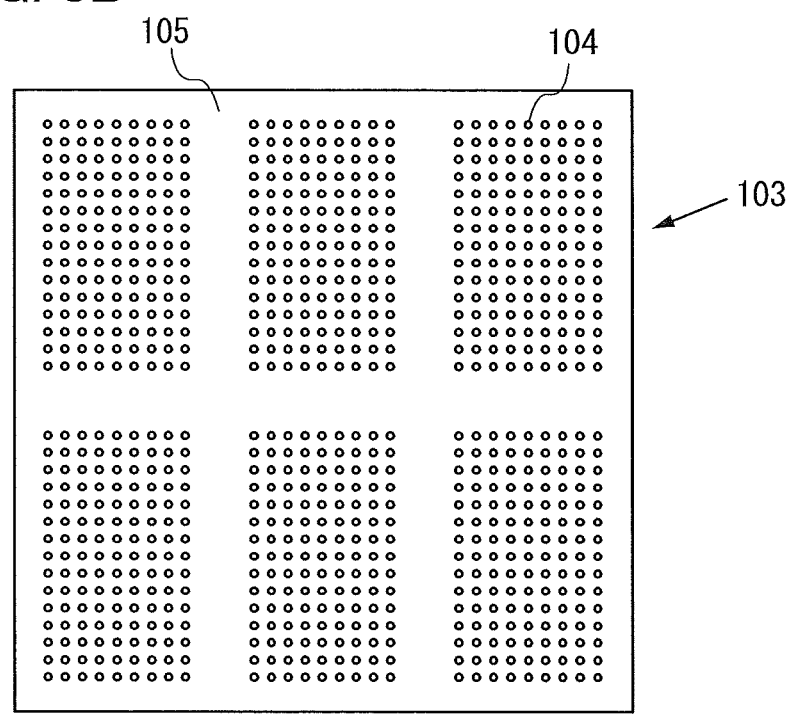

As described later, the shape of the portions provided with the suction micro-holes 104 is determined by the shape of objects obtained by processing. FIG. 3A illustrates a top view of the substrate fixture surface of the substrate holder illustrated in FIGS. 2B and 2C, which includes four portions provided with the suction micro-holes 104. The substrate fixture surface may include six portions provided with the suction micro-holes 104 as illustrated in FIG. 3B. In either case, these portions provided with the suction micro-holes 104 are separated by the portion 105 provided with no holes.

Figure 4A:
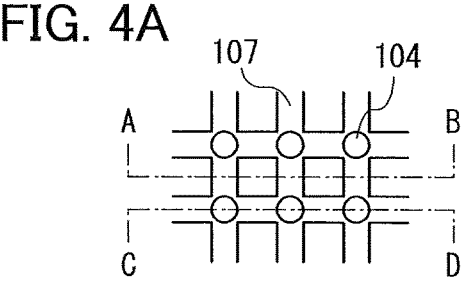
FIGS. 4A to 4C illustrate an example of a substrate holder.
Figure 4B:
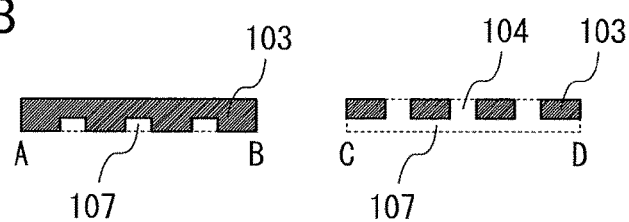
Figure 4C:
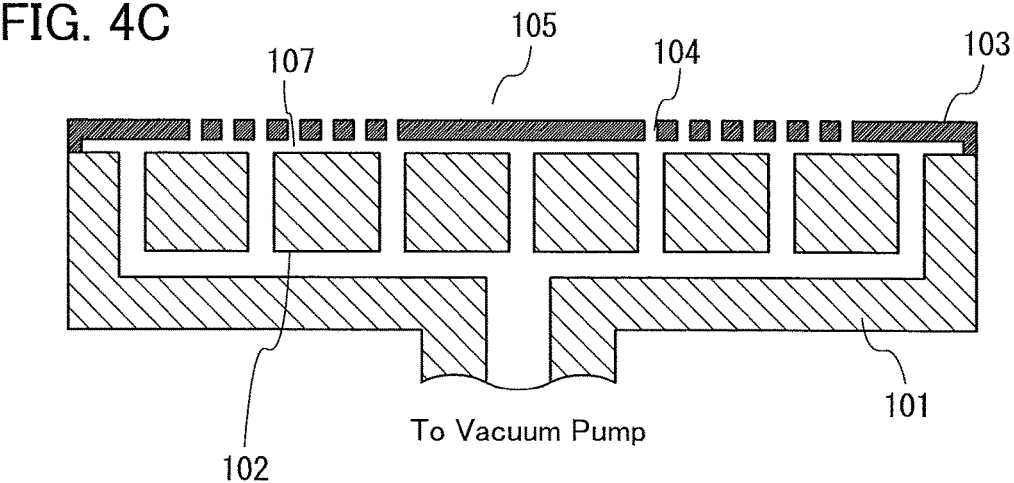

FIG. 4A illustrates a positional relationship between the suction micro-holes 104 and the grooves 107 of the substrate holder 103 illustrated in FIG. 2B. FIG. 4B illustrates a cross-section taken along dashed-dotted line A-B and a cross-section taken along dashed-dotted line C-D in FIG. 4A. Although one suction micro-hole 104 is formed at each intersection of the grooves 107, the present invention is not limited to this example. The suction micro-holes 104 may be formed in portions other than the intersections of the grooves 107, or a plurality of suction micro-holes 104 may be formed at one intersection. FIG. 4C illustrates a schematic cross-sectional view of the suction chuck 101 and the substrate holder 103 fixed to the suction chuck 101.

Suction chucks generally require cleaning after use in order to eliminate clogging of suction holes, and for the cleaning, a method in which a solvent is absorbed through suction holes and then air is reversely blasted is often employed. Such a method has a limited cleaning effect.

Minuter suction holes are more likely to be clogged and therefore require frequent cleaning steps. This increases the length of time for which an apparatus cannot be used, and decreases productivity.

In contrast, more efficient operation can be performed with the use of a detachable substrate fixture surface as in the substrate holder 103. For example, in the case where a plurality of detachable substrate holders 103 are prepared, while one substrate holder is being cleaned, another substrate holder can be used.

Since substrate holders can be detached and cleaned, more effective cleaning can be performed by cleaning in a cleaning tub or the like, for example. In addition, productivity can be improved because many substrate holders 103 can be cleaned at the same time.

As compared with the suction micro-holes 104 of the substrate fixture surface, the suction holes 102 of the suction chuck 101 have a significantly large diameter and therefore require less frequent cleaning. In an extreme example, there may be only one suction hole 102 having a diameter roughly as large as the substrate holder 103.

A method for manufacturing an electronic device using the substrate holder 103 which involves a separation technique will be described.

Figure 5A:
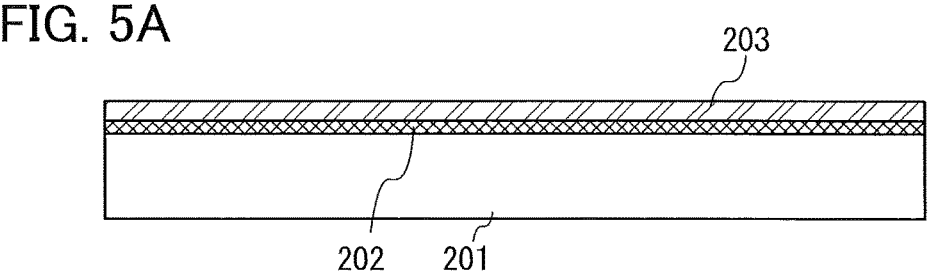
FIGS. 5A to 5D illustrate an example of manufacturing an electronic device.

As illustrated in FIG. 5A, a first separation layer 202 is formed over a first substrate 201, and a first element layer 203 is formed thereover. As the first element layer 203, an element layer including an active element such as a thin film transistor, a display element such as a light-emitting diode, a pixel electrode, a color filter, a light-blocking layer, or the like may be formed. Furthermore, a layer or a film may be provided over the first element layer 203.

The first substrate 201 may be a glass substrate, a quartz substrate, a sapphire substrate, a ceramic substrate, a metal substrate, or the like. For the glass substrate, for example, a glass material such as aluminosilicate glass, aluminoborosilicate glass, or barium borosilicate glass can be used.

In the case where a glass substrate is used as the first substrate 201, when an insulating film such as a silicon oxide film, a silicon oxynitride film, a silicon nitride film, or a silicon nitride oxide film is formed between the first substrate 201 and the first separation layer 202, contamination from the first substrate 201 can be prevented.

The first separation layer 202 has a single-layer structure or a stacked-layer structure containing an element selected from tungsten, molybdenum, titanium, tantalum, niobium, nickel, cobalt, zirconium, zinc, ruthenium, rhodium, palladium, osmium, iridium, and silicon; an alloy material containing any of the elements; or a compound material containing any of the elements. A crystal structure of a layer containing silicon may be amorphous, microcrystal, or polycrystal.

The first separation layer 202 can be formed by a sputtering method, a plasma CVD method, a coating method, a printing method, or the like. Note that a coating method includes a spin coating method, a droplet discharge method, and a dispensing method.

In the case where the first separation layer 202 has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that the mixture of tungsten and molybdenum corresponds to an alloy of tungsten and molybdenum, for example.

In the case where the first separation layer 202 is formed to have a stacked-layer structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, treatment with a highly oxidizing solution such as ozone water, or the like on the surface of the layer containing tungsten. Plasma treatment or heat treatment may be performed in an atmosphere of oxygen, nitrogen, or nitrous oxide, or a mixed gas of any of these gasses and another gas. Surface condition of the first separation layer 202 is changed by the plasma treatment or heat treatment, whereby adhesion between the first separation layer 202 and the first element layer 203 or the like which is formed thereover can be controlled.

Note that an inorganic insulating layer may be provided between the first element layer 203 and the first separation layer 202. The inorganic insulating layer preferably has a single-layer structure or a layered structure including any of a silicon nitride film, a silicon oxynitride film, a silicon nitride oxide film, and the like. The inorganic insulating layer can be fainted by a sputtering method, a plasma CVD method, a coating method, a printing method, or the like. For example, the inorganic insulating layer is formed at a temperature of higher than or equal to 250° C. and lower than or equal to 400° C. by a plasma CVD method, whereby the inorganic insulating layer can be a dense film with very low water permeability.

A second separation layer 207 is formed over one surface of a second substrate 205, and a second element layer 206 is formed thereover. As the second substrate 205, a substrate similar to the first substrate 201 can be used. In the case where the second element layer 206 is formed at high processing temperature, a substrate which can withstand the processing temperature is used. Note that when containing a large amount of barium oxide (BaO), the substrate can be more practically heat-resistant. Alternatively, crystallized glass or the like may be used. For the second separation layer 207, a material similar to that of the first separation layer 202 can be used.

In the case where a glass substrate is used as the second substrate 205, when an insulating film such as a silicon oxide film, a silicon oxynitride film, a silicon nitride film, or a silicon nitride oxide film is formed between the second substrate 205 and the second separation layer 207, contamination from the second substrate 205 can be prevented.

Note that an inorganic insulating layer may be provided between the second element layer 206 and the second separation layer 207. The inorganic insulating layer preferably has a single-layer structure or a layered structure including any of a silicon nitride film, a silicon oxynitride film, a silicon nitride oxide film, and the like. The inorganic insulating layer can be formed by a sputtering method, a plasma CVD method, a coating method, a printing method, or the like. For example, the inorganic insulating layer is formed at a temperature of higher than or equal to 250° C. and lower than or equal to 400° C. by a plasma CVD method, whereby the inorganic insulating layer can be a dense film with very low water permeability.

Figure 5B:
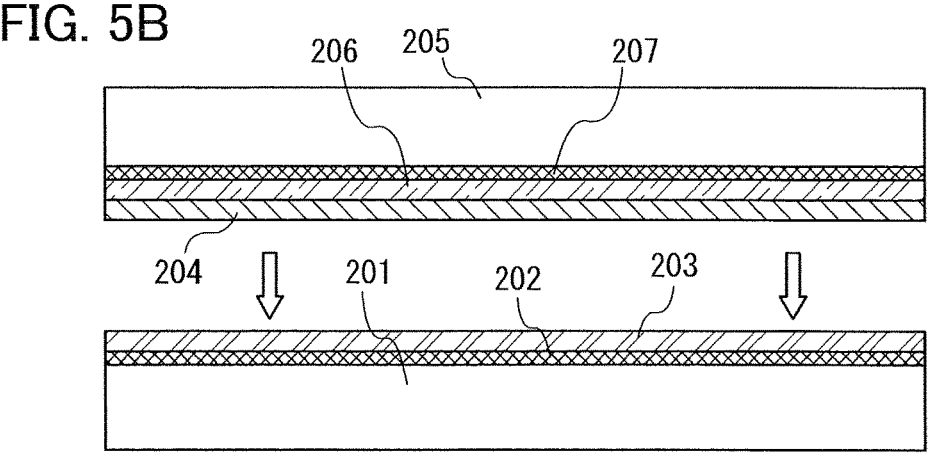

In the second element layer 206, an active element such as a thin film transistor, a display element such as a light-emitting diode, a pixel electrode, a color filter, a light-blocking layer, or the like may be formed. A first adhesive layer 204 is formed over the second element layer 206 and is attached to the first element layer 203 over the first substrate 201 as illustrated in FIG. 5B. Note that in the case where a layer including an element is formed over the first element layer 203, the first adhesive layer 204 is attached to the layer including the element.

For the first adhesive layer 204, a resin that is curable at room temperature such as a two-component type resin, a light-curable resin, a heat-curable resin, or the like can be used. Examples of such resins include an epoxy resin, an acrylic resin, a silicone resin, a phenol resin, and the like. In particular, a material with low moisture permeability, such as an epoxy resin, is preferred. Note that in the case where the second element layer 206 contains a material which deteriorates when exposed to moisture or atmospheric air or the like, sealing can be performed with the first adhesive layer 204.

Figure 5C:
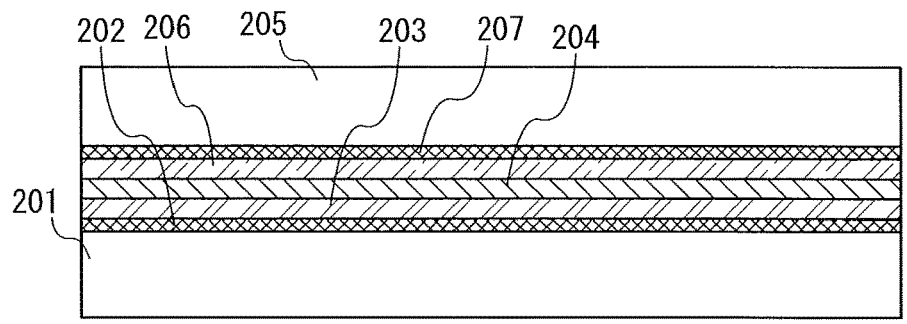

As a result, the first substrate 201 and the second substrate 205 are bonded to each other with the second element layer 206 provided therebetween as illustrated in FIG. 5C.

Figure 5D:
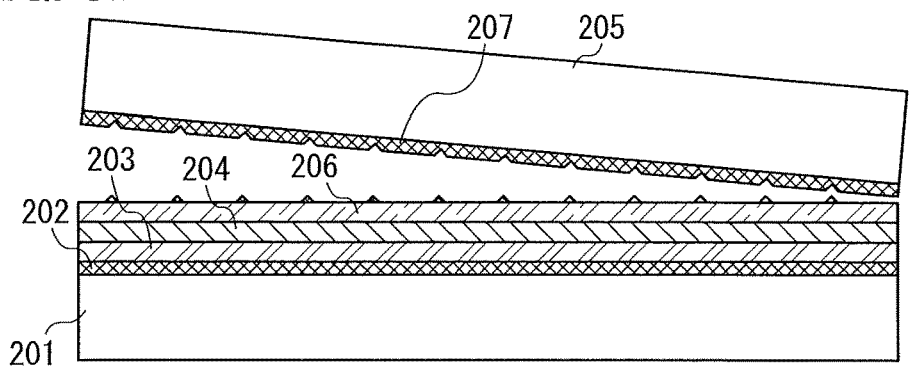

After that, the second substrate 205 is separated from the first substrate 201 at the second separation layer 207 as illustrated in FIG. 5D (first separation step).

Any of a variety of methods can be used as appropriate for the separation process. For example, when a layer including a metal oxide film is formed as the second separation layer 207 on the side in contact with the second element layer 206, the metal oxide film is embrittled by crystallization, whereby the second element layer 206 can be separated from the second substrate 205. Alternatively, part of the separation layer is removed by etching using a solution or a fluoride gas such as $NF_3$, $BrF_3$, or $ClF_3$, whereby the separation can be performed at the embrittled metal oxide film.

In the case where an amorphous silicon film containing hydrogen is formed as the second separation layer 207 between the second substrate 205 and the second element layer 206, the amorphous silicon film is removed by etching, whereby the second element layer 206 can be separated from the second substrate 205.

Furthermore, a method may be used in which a film containing nitrogen, oxygen, hydrogen, or the like (for example, an amorphous silicon film containing hydrogen, an alloy film containing hydrogen, an alloy film containing oxygen, or the like) is used as the second separation layer 207, and the second separation layer 207 is irradiated with laser light to release the nitrogen, oxygen, or hydrogen contained in the second separation layer 207 as a gas, thereby promoting separation between the second element layer 206 and the second substrate 205.

Alternatively, it is possible to use a method in which the second substrate 205 provided with the second element layer 206 is eliminated mechanically or removed by etching using a solution or a fluoride gas such as $NF_3$, $BrF_3$, or $ClF_3$, or the like. In this case, the second separation layer 207 is not necessarily provided.

Further, the separation can be conducted easily by combination of the above-described separation methods. For example, separation can be performed with physical force by a machine or the like after performing laser light irradiation, etching on the second separation layer 207 with a gas, a solution, or the like, or mechanical elimination of the second separation layer 207 with a sharp knife, scalpel, or the like so that the second separation layer 207 and the second element layer 206 can be easily separated from each other.

Separation of the second element layer 206 from the second substrate 205 may be carried out by filling the interface between the second separation layer 207 and the second element layer 206 with a liquid. Further, the separation may be conducted while a liquid such as water is being poured.

As another separation method, in the case where the second separation layer 207 is formed using tungsten, it is preferable that the separation be performed while etching the second separation layer 207 using a mixed solution of ammonia water and a hydrogen peroxide solution.

Note that the second separation layer 207 is not necessary in the case where separation at the interface between the second substrate 205 and the second element layer 206 is possible. For example, glass is used as the second substrate 205, an organic resin such as polyimide is formed in contact with the glass, and the second element layer 206 is formed over the organic resin. In this case, heating the organic resin enables the separation at the interface between the second substrate 205 and the organic resin. Alternatively, separation at the interface between a metal layer and the organic resin may be performed in the following manner the metal layer is provided between the second substrate 205 and the organic resin and current is made to flow in the metal layer so that the metal layer is heated.

Figure 6A:
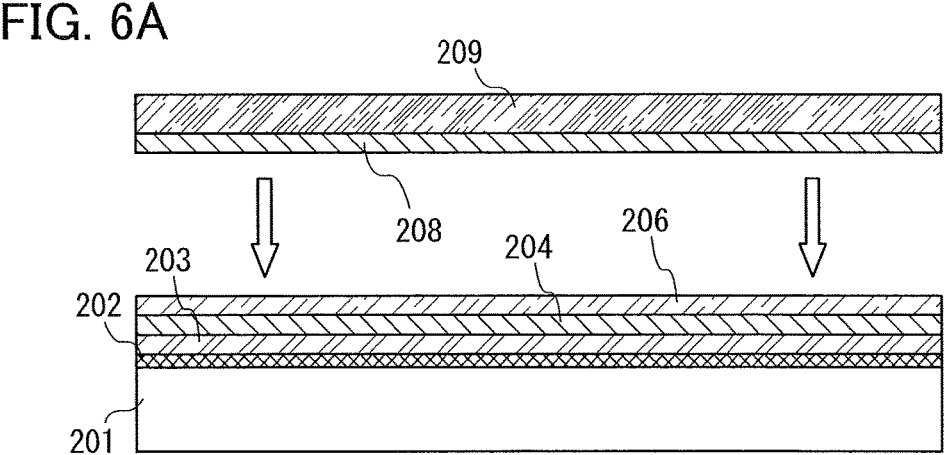
FIGS. 6A to 6C illustrate an example of manufacturing an electronic device.

A second adhesive layer 208 is formed over one surface of a film substrate 209 as illustrated in FIG. 6A. After a surface of the second element layer 206 from which the second substrate 205 has been separated is cleaned to remove a residue of the second separation layer 207 or the like, the film substrate 209 is bonded thereto. For the second adhesive layer 208, a material similar to that of the first adhesive layer 204 may be used. For the film substrate 209, any of a variety of organic resin materials may be used.

The first substrate 201 and the film substrate 209 which are bonded to each other are referred to as a bonded substrate 200. The bonded substrate 200 includes the first substrate 201, the first separation layer 202, the first element layer 203, the first adhesive layer 204, the second element layer 206, the second adhesive layer 208, and the film substrate 209.

Figure 6B:
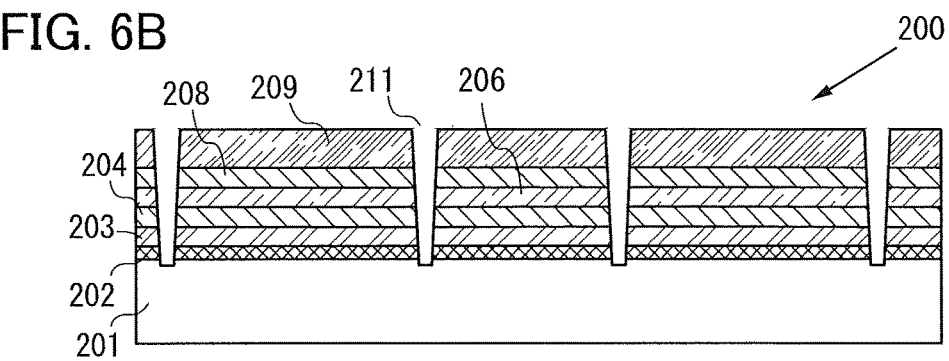

As illustrated in FIG. 6B, scribed grooves 211 are formed in the first separation layer 202, the first element layer 203, the first adhesive layer 204, the second element layer 206, the second adhesive layer 208, and the film substrate 209 by a laser scribing method, for example. The pattern of the scribed grooves 211 is, for example, rectangular as illustrated in FIG. 8A and is substantially identical to the peripheral portion of the portion provided with the suction micro-holes 104 on the substrate fixture surface of the substrate holder 103.

Figure 6C:
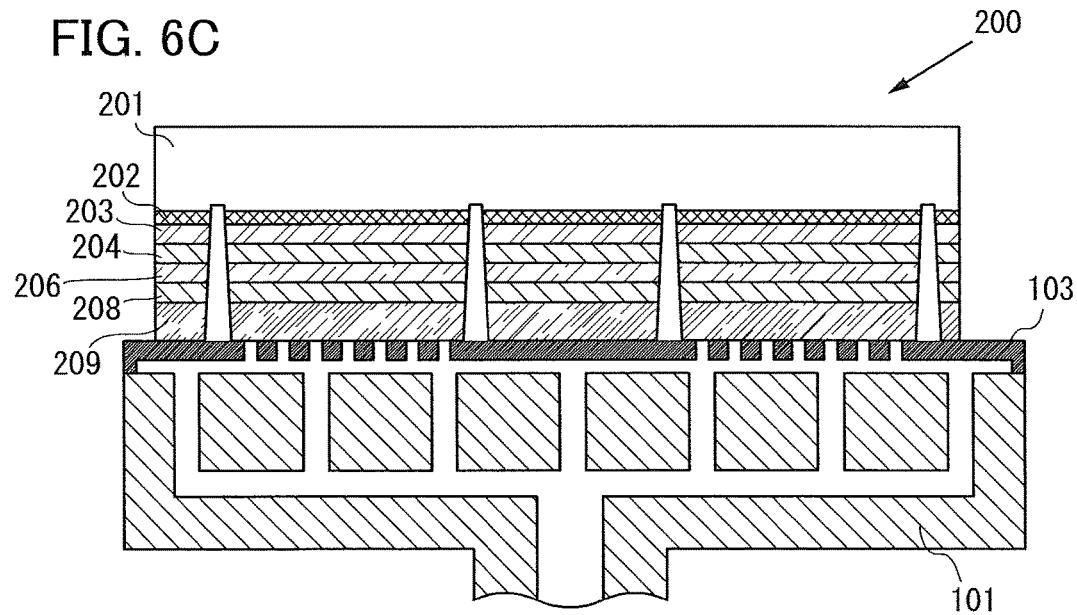
Figure 8A:
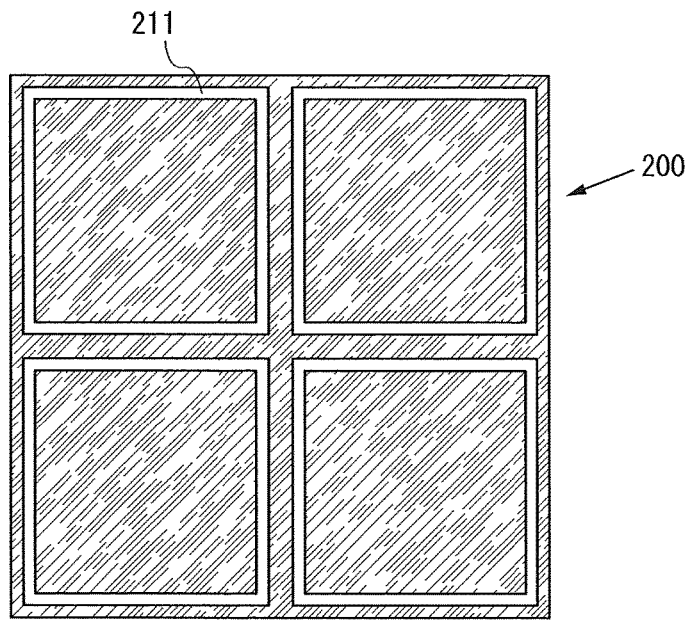
FIGS. 8A and 8B illustrate an example of manufacturing an electronic device.
Figure 8B:
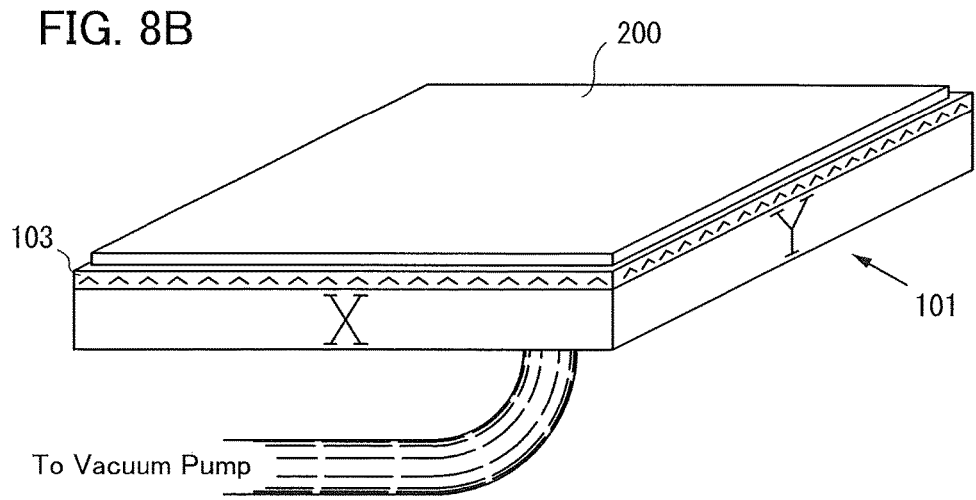

As illustrated in FIG. 6C or 8B, the substrate holder 103 is fixed to the suction chuck 101, and the bonded substrate 200 is placed such that the film substrate 209 is in contact with the substrate fixture surface of the substrate holder 103, and is then suction-fixed.

Figure 7A:
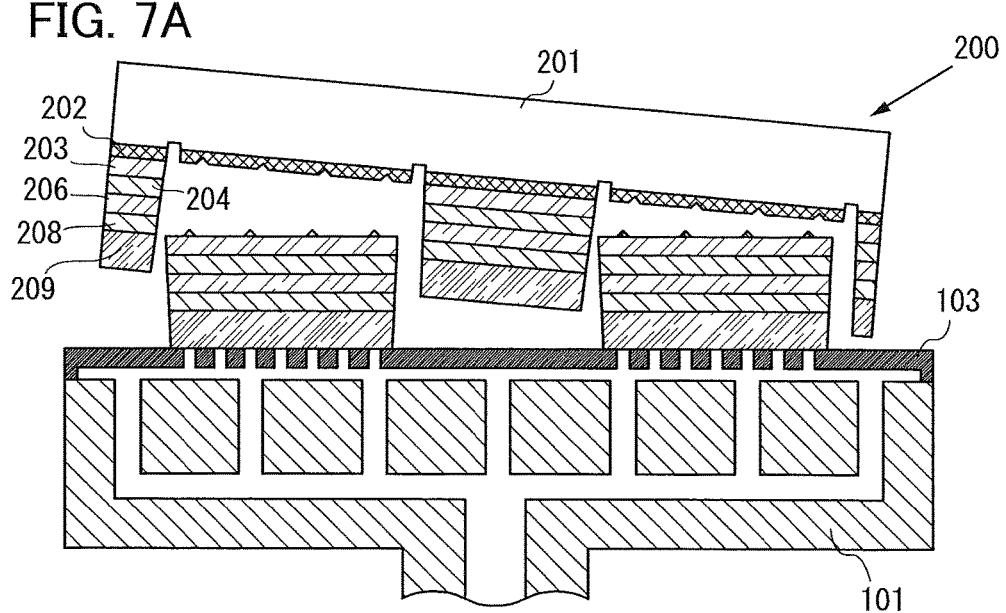
FIGS. 7A to 7C illustrate an example of manufacturing an electronic device.

When one end of the first substrate 201 is lifted, the first substrate 201 and the film substrate 209 are separated from each other in the vicinity of the first separation layer 202 as illustrated in FIG. 7A because the suction force is strong in the portions provided with the suction micro-holes 104 of the substrate holder 103 and thus the film substrate 209 is not easily released from the substrate holder 103. On the other hand, in the portion 105 provided with no holes, the film substrate 209 is not suctioned and is therefore lifted while being bonded to the first substrate 201.

Figure 7B:
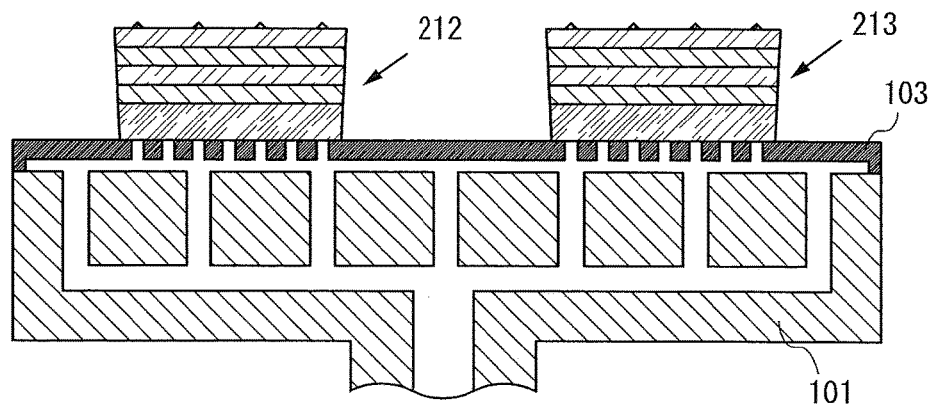

As a result, rectangular portions surrounded by the scribed grooves 211 illustrated in FIG. 8A in the bonded substrate 200 are separated from the first substrate 201 and are left over the substrate holder 103 as a first element substrate 212 and a second element substrate 213 as illustrated in FIG. 7B (second separation step).

Figure 7C:
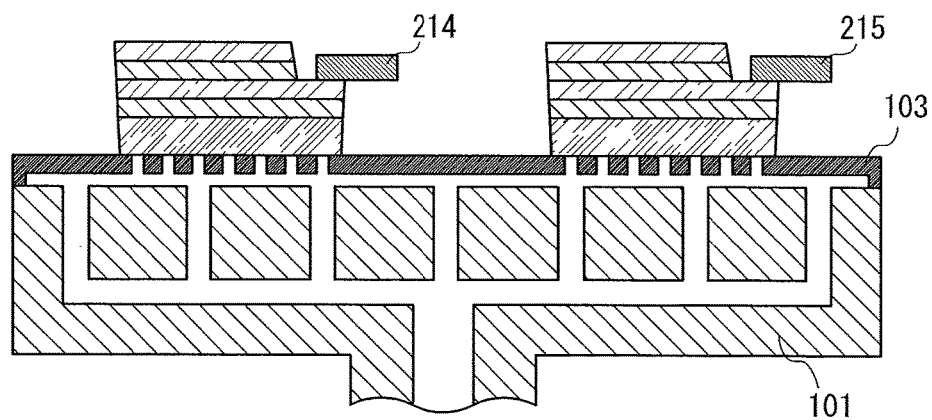

A residue of the first separation layer 202 is removed from surfaces of the first element substrate 212 and the second element substrate 213, and furthermore, the first element layer 203 and the first adhesive layer 204 are partly removed. A flexible printed circuit 214 and a flexible printed circuit 215 are pressure-bonded as illustrated in FIG. 7C.

Thus, electronic devices are completed. Note that another film substrate may be provided over the first element layer 203 before or after pressure-bonding the flexible printed circuit 214 and the flexible printed circuit 215.

When the vacuum of the suction chuck is broken, the substrate holder 103 loses a force to suction the first element substrate 212 and the second element substrate 213, and thus these element substrates can be taken out. After that, the first element substrate 212 and the second element substrate 213 may be subjected to further processing.

As described above, the separation step and the cutting step can be performed at the same time. Therefore, productivity can be improved, and a defect or characteristic degradation due to separation or cutting can be prevented.

When a flexible material is used for both the first element layer 203 and the film substrate 209 in the above example, flexible electronic devices can be obtained from the first element substrate 212 and the second element substrate 213.

Defects of flexible electronic devices are especially caused by cutting in many cases. In a general process, element substrates of a necessary size are formed by cutting two substrates between which an element layer is provided. When both of the two substrates are flexible, cutting is difficult.

On the contrary, the above-described method, in which the second element layer 206 is provided over an inflexible substrate (the first substrate 201), can increase the stability in cutting and can suppress the generation of defective devices.

Here, an example of a separation method which can be used in the first and second separation steps will be described.

Figure 9A:
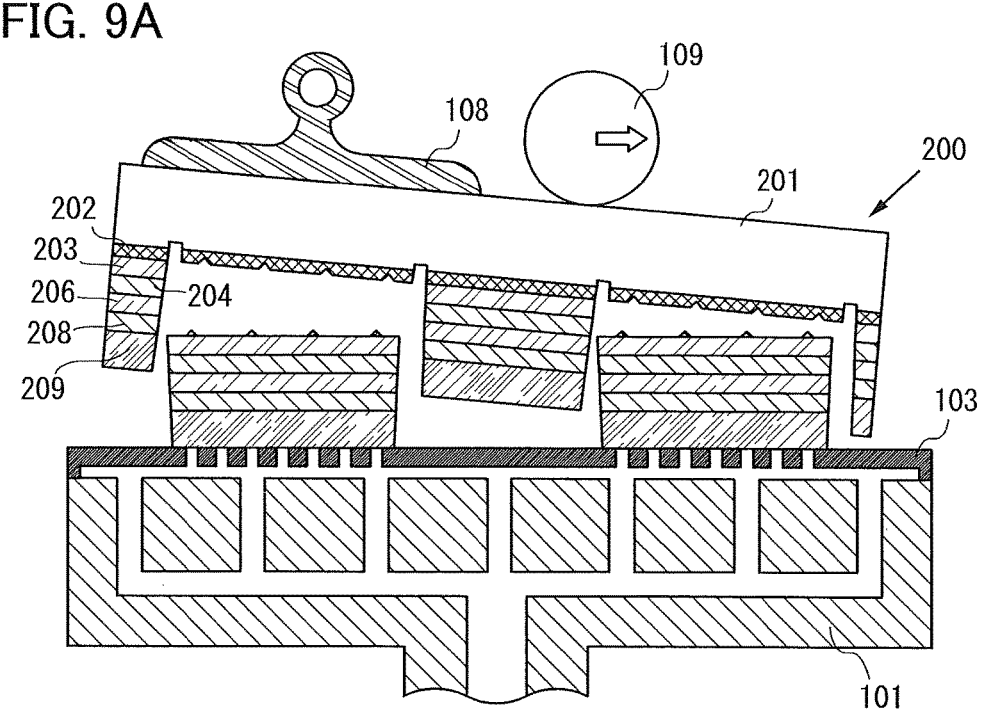
FIGS. 9A and 9B illustrate an example of manufacturing an electronic device.

FIG. 9A illustrates the above-described second separation step in which the first substrate 201 is lifted using a suction cup 108 adhered to one end of the first substrate 201. In the diagram, separation starts from the left end where the suction cup 108 is provided, and proceeds toward the right end. At that time, the progress of separation may be controlled by pressing the first substrate 201 with a roller 109. The roller 109 moves to the right side as the separation proceeds.

Figure 9B:
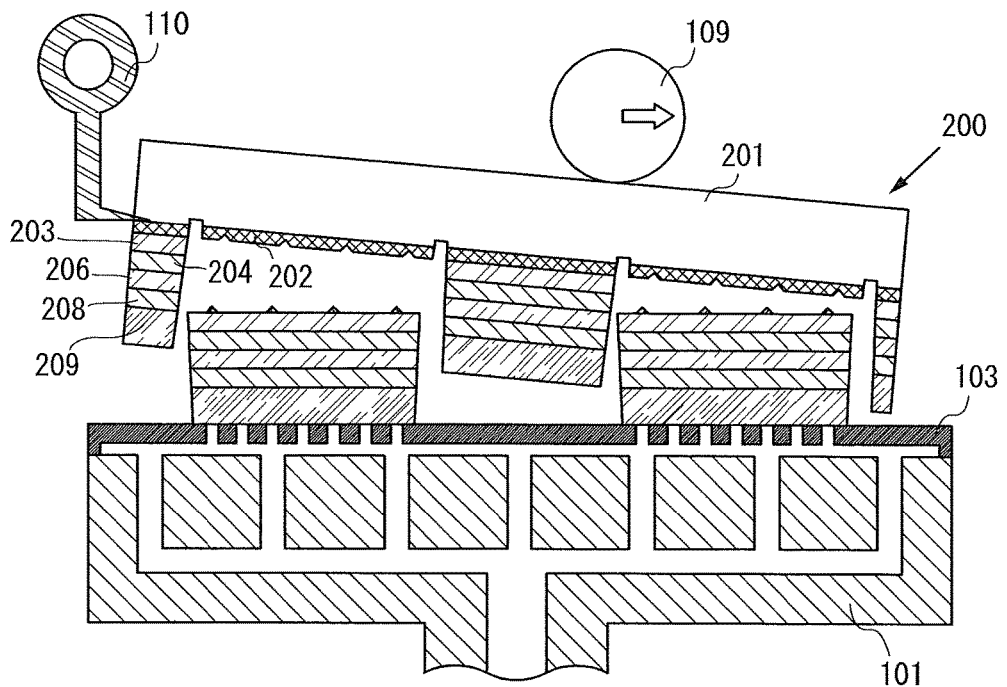

FIG. 9B illustrates the above-described second separation step in which the first substrate 201 is lifted by lifting a hook 110 with a sharp edge inserted in one end of the first substrate 201 (or in the first separation layer 202, the first element layer 203, the first adhesive layer 204, the second element layer 206, the second adhesive layer 208, or the film substrate 209 or between any two of these components).

Figure 10A:
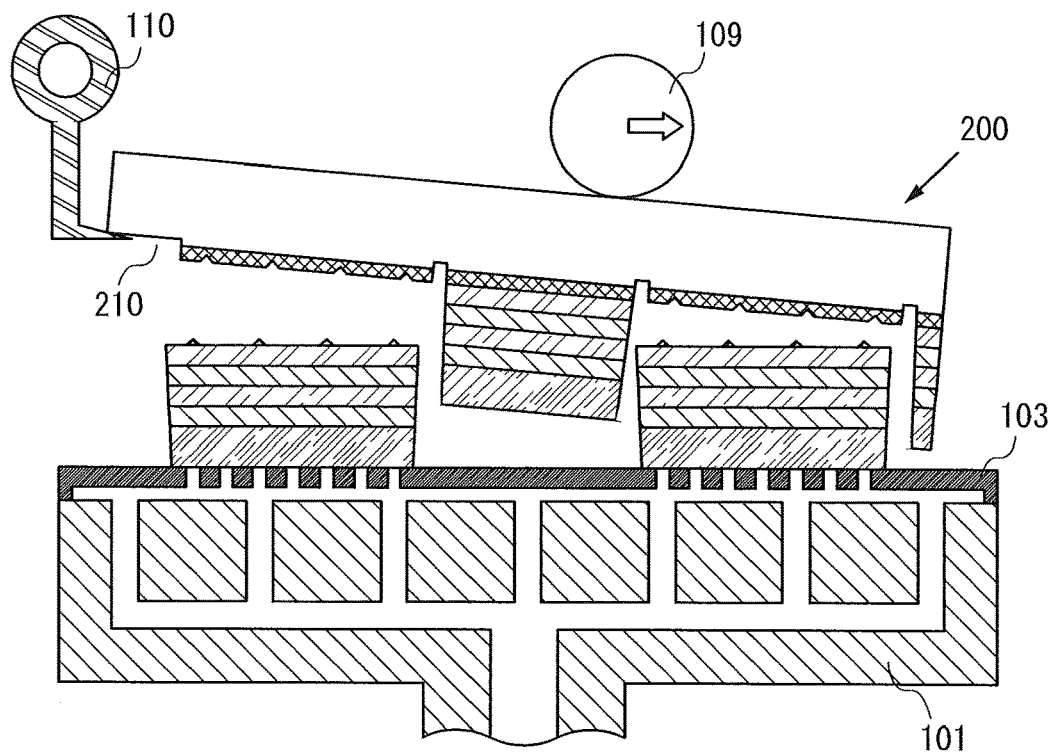
FIGS. 10A and 10B illustrate an example of manufacturing an electronic device.

FIG. 10A illustrates the above-described second separation step in which the first substrate 201 is lifted by lifting the hook 110 with the edge placed in a portion at one end of the first substrate 201 (a partly removed portion 210) from which the first separation layer 202, the first element layer 203, the first adhesive layer 204, the second element layer 206, the second adhesive layer 208, and the film substrate 209 have been removed.

Figure 10B:
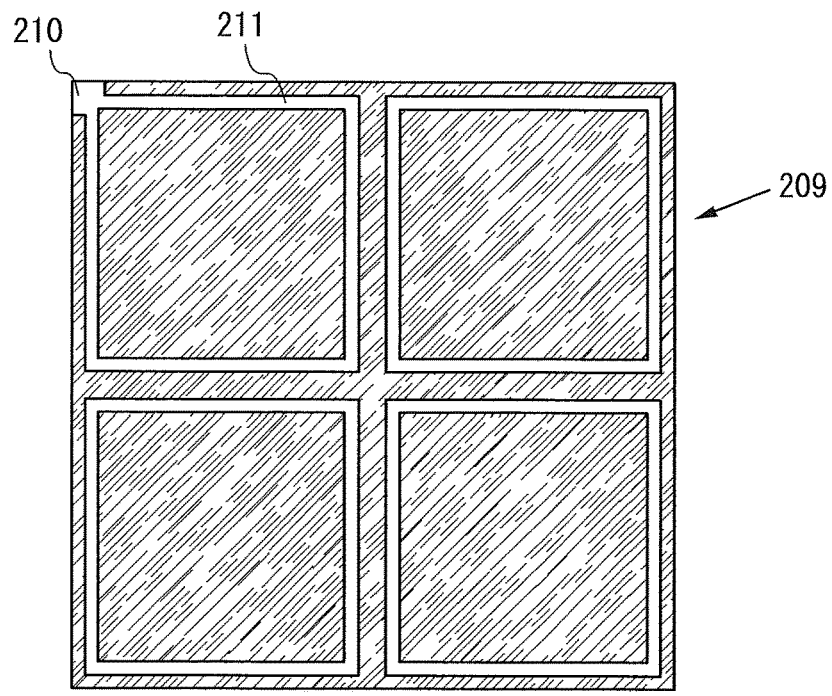

The partly removed portion 210 may be provided in one corner of the bonded substrate 200 as illustrated in FIG. 10B and can be formed at the same time as the scribed grooves 211.

Figure 11A:
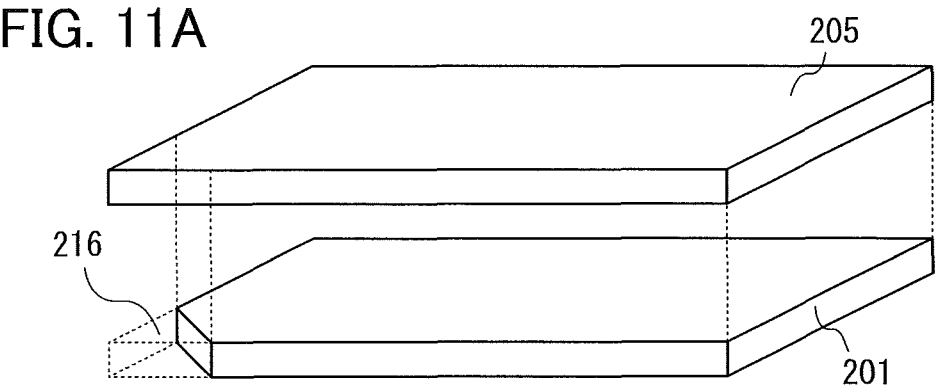
FIGS. 11A to 11C illustrate an example of manufacturing an electronic device.
Figure 11B:
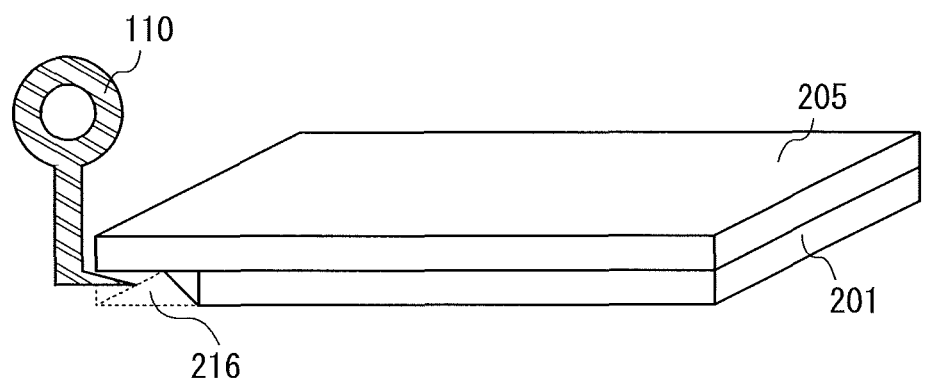

These methods can also be employed in the first separation step. Note that in the case where the method illustrated in FIG. 10A is employed in the first separation step, a removed portion 216 is preferably provided in advance at one end of the first substrate 201 as illustrated in FIG. 11A. An orientation flat may be used as the removed portion 216. After the first substrate 201 and the second substrate 205 are bonded to each other, the edge of the hook 110 may be inserted as illustrated in FIG. 11B and the hook 110 is then lifted, whereby the first substrate and the second substrate can be separated from each other, for example.

In that case, it should be ensured that separation is started on an intended side because the first substrate 201 and the second substrate 205 are provided with the first separation layer 202 and the second separation layer 207, respectively. In the first separation step, it should be ensured that separation occurs at the second separation layer 207. For that purpose, a cut is preferably made with the edge of the hook 110 in the first adhesive layer 204, the second element layer 206, and the second separation layer 207 over the surface of the second substrate 205.

Figure 11C:
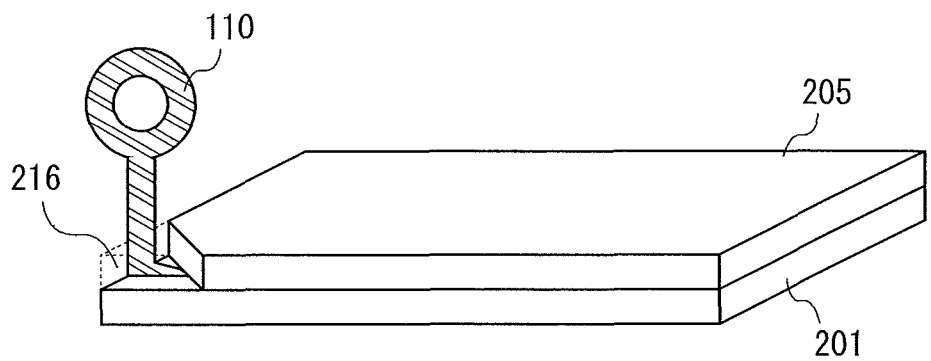

Alternatively, the second substrate 205 may be provided with the removed portion 216. In that case, the edge of the hook 110 is inserted in the bonded portion between the first substrate 201 and the second substrate 205 from the removed portion 216 as illustrated in FIG. 11C. By lifting the hook 110, the second substrate 205 can be lifted and separated from the first substrate 201. At that time, the edge of the hook 110 may be inserted after an exposed portion of the first separation layer 202 over the first substrate 201 which is under the removed portion 216 is removed partly or entirely.

Embodiment 2

In this embodiment, a processing method using a substrate holder which does not include a region provided with no micro-holes or a substrate holder which is provided with evenly (or substantially evenly) distributed micro-holes is particularly described. Embodiment 1 may be referred to for details.

Figure 14A:
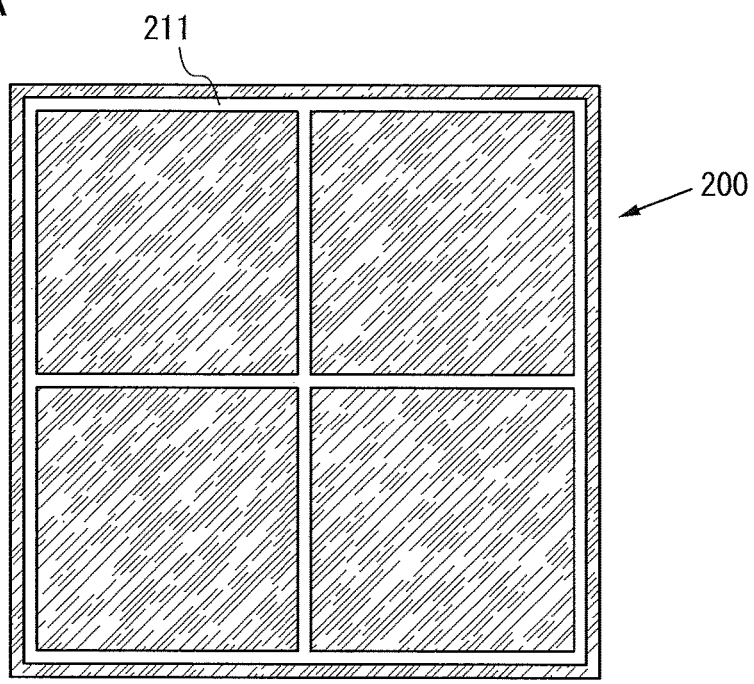
FIGS. 14A and 14B illustrate an example of manufacturing an electronic device.
Figure 14B:
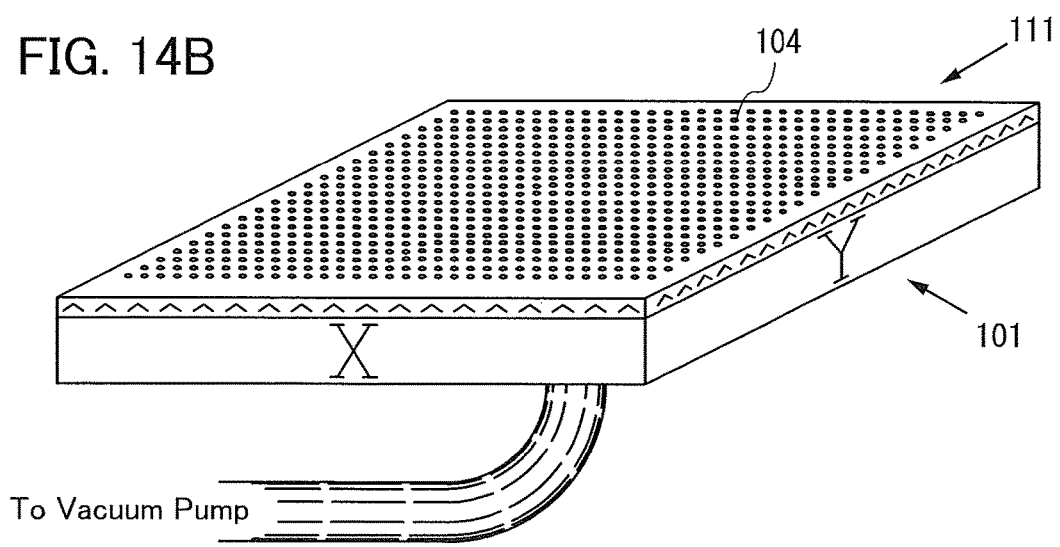

As illustrated in FIG. 14B, a substrate holder 111 used in this embodiment is provided with the suction micro-holes 104 which are distributed evenly. In this example, a substrate is held by the substrate holder 111 fixed to the suction chuck 101, whereas the substrate may be held by the suction chuck 101 alone. That is, it is acceptable as long as the suction chuck 101 has suction holes the number of which is sufficient to hold the substrate and corresponds to the number of regions to be divided.

Figure 12A:
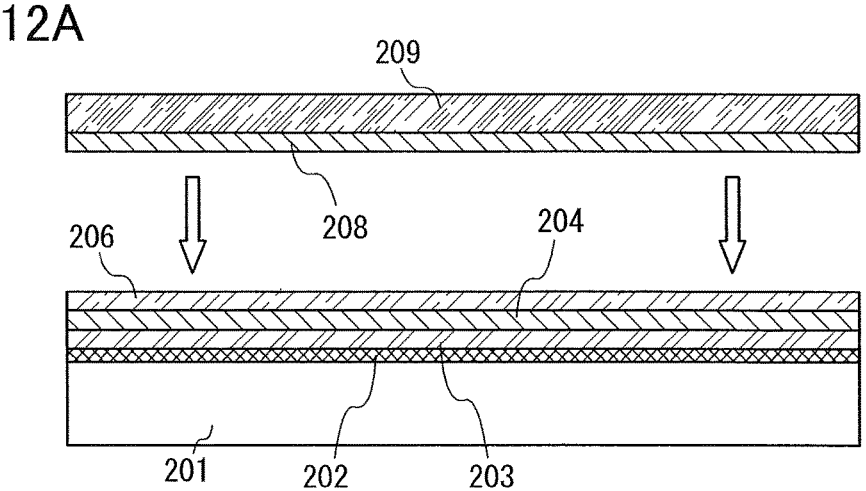
FIGS. 12A to 12C illustrate an example of manufacturing an electronic device.

By the method described in Embodiment 1 with reference to FIGS. 5A to 5D, the first separation layer 202, the first element layer 203, the first adhesive layer 204, and the second element layer 206 are formed over the first substrate 201. Then, as illustrated in FIG. 12A, the second adhesive layer 208 is formed over one surface of the film substrate 209, and the second element layer 206 is bonded to the film substrate 209 with the second adhesive layer 208. Thus, the bonded substrate 200 is obtained.

Figure 12B:
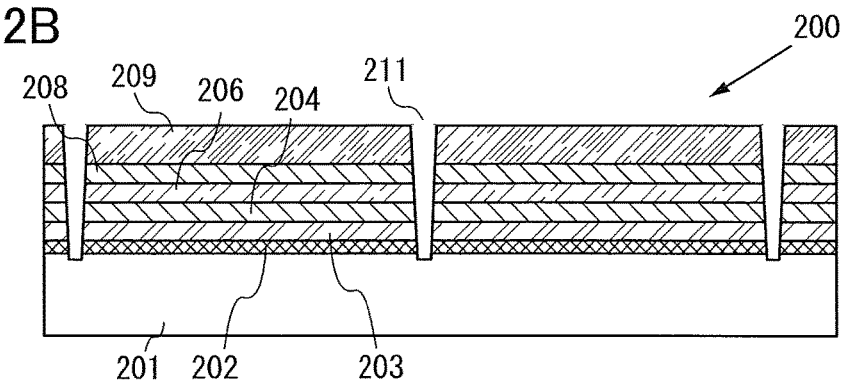

As illustrated in FIG. 12B, the scribed grooves 211 are formed in the first separation layer 202, the first element layer 203, the first adhesive layer 204, the second element layer 206, the second adhesive layer 208, and the film substrate 209. The pattern of the scribed grooves 211 is, for example, rectangular as illustrated in FIG. 14A. Note that the scribed grooves 211 may have a cross shape.

Figure 12C:
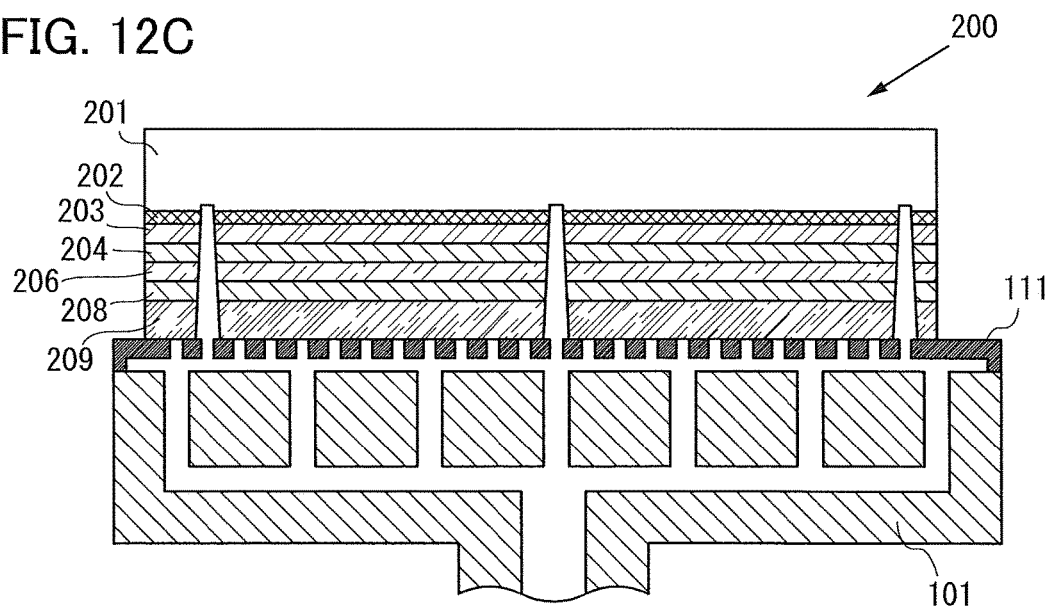

As illustrated in FIG. 12C, the substrate holder 111 is fixed to the suction chuck 101, and the bonded substrate 200 is placed such that the film substrate 209 is in contact with the substrate fixture surface of the substrate holder 111, and is then fixed by suction.

Figure 13A:
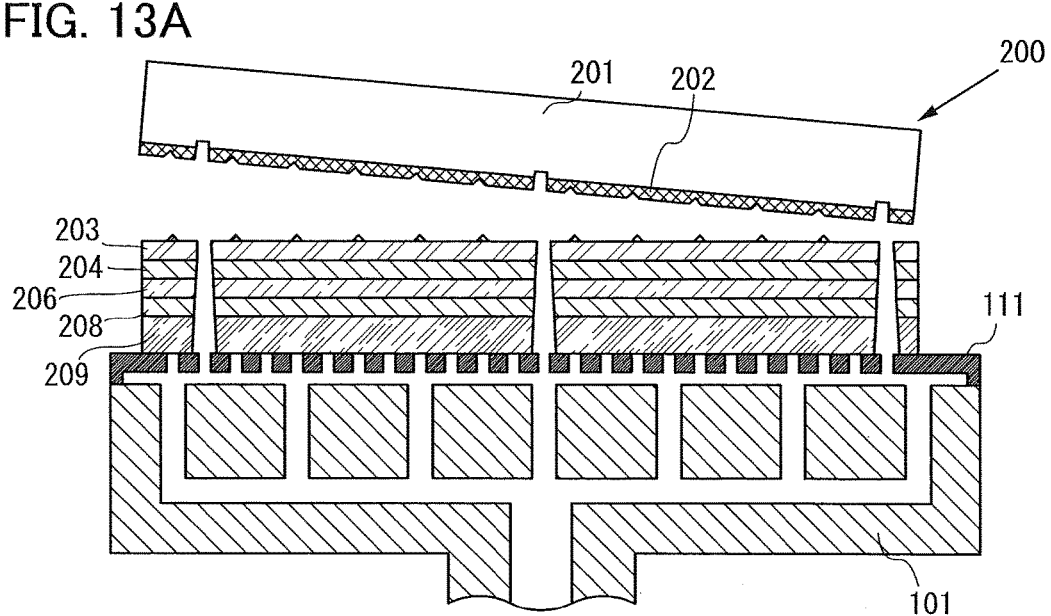
FIGS. 13A to 13C illustrate an example of manufacturing an electronic device.

When one end of the first substrate 201 is lifted, the first substrate 201 and the film substrate 209 are separated from each other in the vicinity of the first separation layer 202 as illustrated in FIG. 13A. Since the first separation layer 202, the first element layer 203, the first adhesive layer 204, the second element layer 206, the second adhesive layer 208, and the film substrate 209 are provided with the scribed grooves 211, the first element layer 203, the first adhesive layer 204, the second element layer 206, the second adhesive layer 208, and the film substrate 209 are divided by the scribed grooves 211. Thus, the first element substrate 212 and the second element substrate 213 are obtained.

Figure 13B:
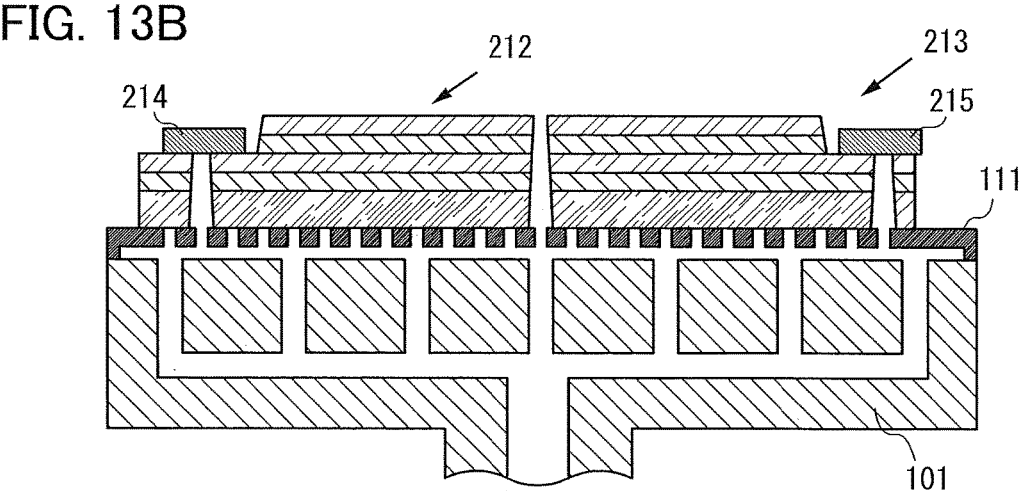
Figure 13C:
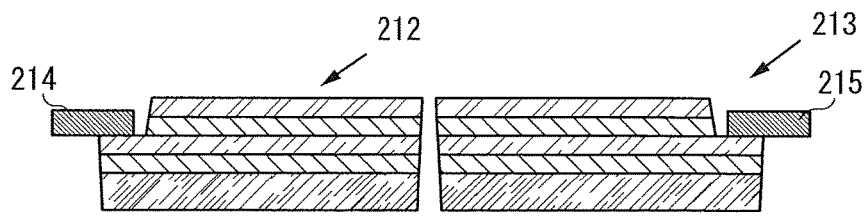

A residue of the first separation layer 202 is removed from the first element substrate 212 and the second element substrate 213, and furthermore, the first element layer 203 and the first adhesive layer 204 are partly removed. The flexible printed circuit 214 and the flexible printed circuit 215 are pressure-bonded as illustrated in FIG. 13B. Thus, electronic devices are completed. Note that another film substrate may be provided over the first element layer 203 before or after pressure-bonding the flexible printed circuit 214 and the flexible printed circuit 215.

When the vacuum of the suction chuck is broken, the substrate holder 111 loses a force to suction the first element substrate 212 and the second element substrate 213, and thus these element substrates can be taken out. After that, the first element substrate 212 and the second element substrate 213 may be subjected to further processing.

Embodiment 3

In this embodiment, a light-emitting device which is an example of the electronic device described in Embodiment 1 or 2 is described with reference to FIGS. 15A and 15B, FIGS. 16A and 16B, FIGS. 17A and 17B, and FIGS. 18A and 18B.

Specific Example 1

Figure 15A:
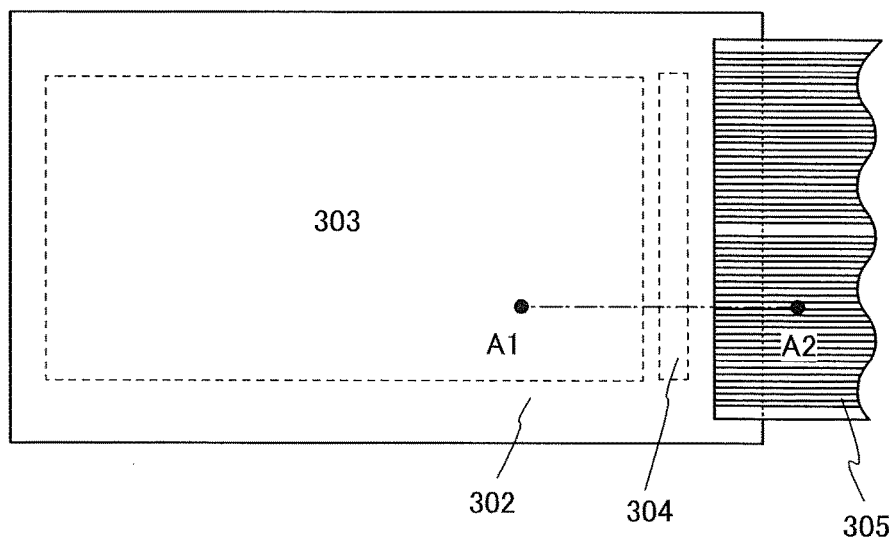
FIGS. 15A and 15B illustrate an example of a light-emitting device of one embodiment of the present invention.
Figure 15B:
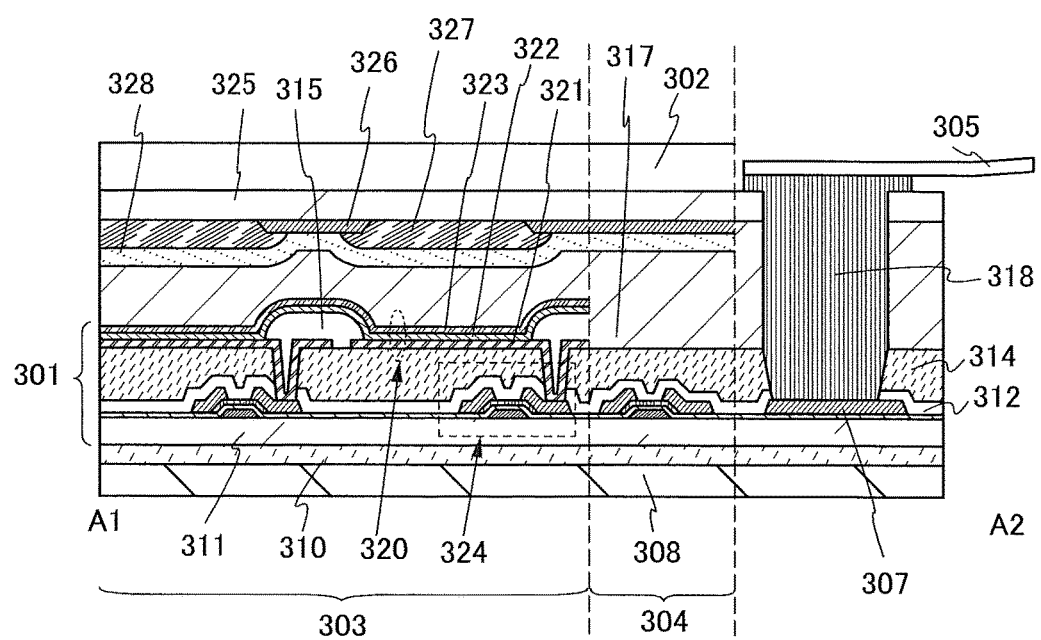

FIG. 15A is a plan view of the light-emitting device, and FIG. 15B is an example of a schematic cross-sectional view taken along dashed-dotted line A1-A2 in FIG. 15A.

The light-emitting device illustrated in FIG. 15B includes an element layer 301, an organic material layer 302, a substrate 308, an adhesive layer 310, a sealing layer 317, an insulating layer 325, a light-blocking layer 326, a coloring layer 327, and an insulating layer 328. The element layer 301 includes a conductive layer 307, an insulating layer 311, an insulating layer 312, an insulating layer 314, an insulating layer 315, a plurality of light-emitting elements including a light-emitting element 320, and a plurality of transistors including a transistor 324.

The conductive layer 307 is electrically connected to a flexible printed circuit 305 through a connector 318.

The light-emitting element 320 includes a lower electrode 321, an EL layer 322, and an upper electrode 323. The lower electrode 321 is electrically connected to a source electrode or a drain electrode of the transistor 324. An end portion of the lower electrode 321 is covered with the insulating layer 315. The light-emitting element 320 has a top emission structure. The upper electrode 323 has a light-transmitting property and transmits light emitted from the EL layer 322.

The coloring layer 327 is provided to overlap with the light-emitting element 320, and the light-blocking layer 326 is provided to overlap with the insulating layer 315. The coloring layer 327 and the light-blocking layer 326 are covered with the insulating layer 328. The space between the light-emitting element 320 and the insulating layer 328 is filled with the sealing layer 317.

The light-emitting device includes a plurality of transistors in a light extraction portion 303 and a driver circuit portion 304. The transistors are provided over the insulating layer 311. The insulating layer 311 and the substrate 308 are attached to each other with the adhesive layer 310. It is preferable to use films with low water permeability for the insulating layer 311 and the insulating layer 325, in which case an impurity such as water can be prevented from entering the light-emitting element 320 or the transistor 324, leading to improved reliability of the light-emitting device.

The light-emitting device in Specific Example 1 can be manufactured in the following manner: the organic material layer 302, the insulating layer 325, the coloring layer 327, and the light-blocking layer 326 are formed over a first formation substrate; the insulating layer 311, the transistor 324, and the light-emitting element 320 are formed over a second formation substrate; these two formation substrates are attached to each other using the sealing layer 317 as an adhesive layer; the insulating layer 311, the transistor 324, the light-emitting element 320, the organic material layer 302, the insulating layer 325, the coloring layer 327, and the light-blocking layer 326 are separated from the second formation substrate; and the insulating layer 311 and the substrate 308 are attached to each other with the adhesive layer 310.

In the case where a material with low heat resistance (e.g., resin) is used for a substrate, the substrate cannot be heated to high temperature in the manufacturing process. Thus, there is a limitation on conditions for forming a transistor and an insulating film over the substrate. In such a case, in the manufacturing method of this embodiment, a transistor and the like can be transferred to the substrate after being formed over a formation substrate having high heat resistance. Even when the formation substrate has high water permeability, as long as the substrate 308, the organic material layer 302 and the like, and the substrate provided therewith have sufficiently low water permeability, the reliability of the light-emitting device can be improved.

The organic material layer 302 and the substrate 308 are each preferably formed using a material with high toughness. Thus, a light-emitting device with high impact resistance that is less likely to be broken can be provided. For example, when the organic material layer 302 is an organic resin substrate and the substrate 308 is a substrate formed using a thin metal material or a thin alloy material, the light-emitting device can be more lightweight and less likely to be broken as compared with the case where a glass substrate is used.

A metal material and an alloy material, which have high thermal conductivity, are preferred because they can easily conduct heat to the whole substrate and accordingly can prevent a local temperature rise in the light-emitting device. The thickness of a substrate using a metal material or an alloy material is preferably greater than or equal to 10 μm and less than or equal to 200 μm, further preferably greater than or equal to 20 μm and less than or equal to 50 μm.

Further, when a material with high thermal emissivity is used for the substrate 308, the surface or internal temperature of the light-emitting device can be prevented from rising, leading to prevention of breakage or a decrease in reliability of the light-emitting device. For example, the substrate 308 may have a stacked structure of a metal substrate and a layer with high thermal emissivity (the layer can be formed using a metal oxide or a ceramic material, for example).

Specific Example 2

Figure 16A:
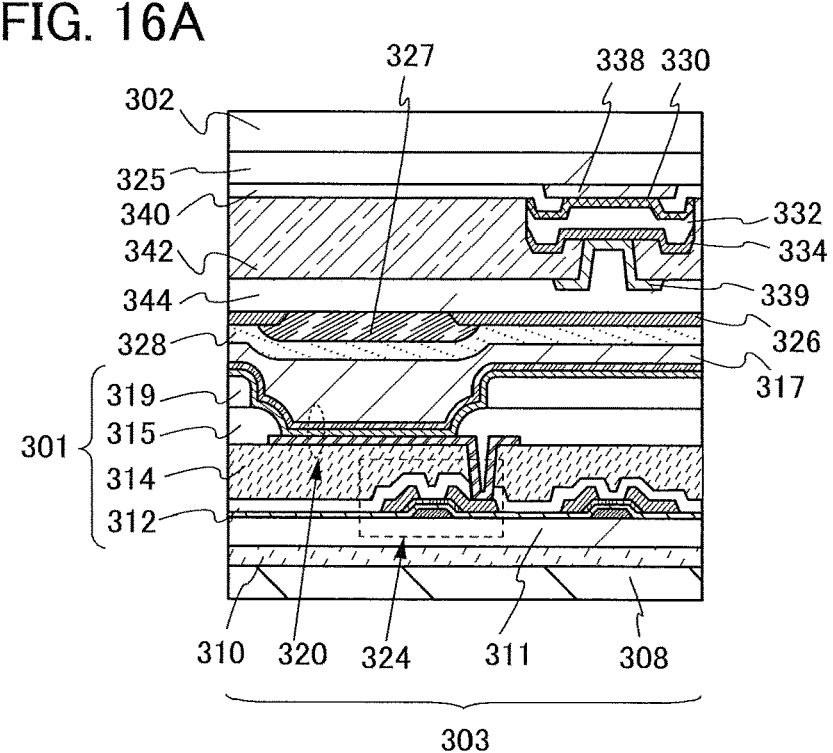
FIGS. 16A and 16B each illustrate an example of a light-emitting device of one embodiment of the present invention.

FIG. 16A illustrates another example of the light extraction portion 303 in the light-emitting device of one embodiment of the present invention. The light-emitting device illustrated in FIG. 16A is capable of touch operation. In the following specific examples, description of components similar to those in Specific Example 1 is omitted.

The light-emitting device illustrated in FIG. 16A includes an element layer 301, an organic material layer 302, a substrate 308, an adhesive layer 310, a sealing layer 317, an insulating layer 325, a light-blocking layer 326, a coloring layer 327, an insulating layer 328, a plurality of light-receiving elements, a conductive layer 338, a conductive layer 339, an insulating layer 340, an insulating layer 342, and an insulating layer 344. The element layer 301 includes an insulating layer 311, an insulating layer 312, an insulating layer 314, an insulating layer 315, a spacer 319, a plurality of light-emitting elements including a light-emitting element 320, and a plurality of transistors including a transistor 324.

Specific Example 2 includes the spacer 319 over the insulating layer 315. The space between the organic material layer 302 and the substrate 308 can be adjusted with the spacer 319.

FIG. 16A illustrates an example in which a light-receiving element is provided between the insulating layer 325 and the sealing layer 317. Since the light-receiving element can be placed to overlap with a non-light-emitting region (e.g., a region where the transistor 324 or a wiring is provided) on the substrate 308 side, the light-emitting device can be provided with a touch sensor without a decrease in the aperture ratio of a pixel (light-emitting element).

As the light-receiving element included in the light-emitting device of one embodiment of the present invention, for example, a p-n photodiode or a p-i-n photodiode can be used. In this embodiment, a p-i-n photodiode including a p-type semiconductor layer 330, an i-type semiconductor layer 332, and an n-type semiconductor layer 334 is used as the light-receiving element.

Note that the i-type semiconductor layer 332 is a semiconductor in which the concentration of each of an impurity imparting p-type conductivity and an impurity imparting n-type conductivity is $1 \times 10^{20}$ cm$^{-3}$ or less and which has photoconductivity 100 times or more as high as dark conductivity. The i-type semiconductor layer 332 also includes, in its category, a semiconductor that contains an impurity element belonging to Group 13 or Group 15 of the periodic table. In other words, since an i-type semiconductor has weak n-type electric conductivity when an impurity element for controlling valence electrons is not added intentionally, the i-type semiconductor layer 332 includes, in its category, a semiconductor to which an impurity element imparting p-type conductivity is added intentionally or unintentionally at the time of deposition or after the deposition.

The light-blocking layer 326 is located closer to the substrate 308 than the light-receiving element is and overlaps with the light-receiving element. The light-blocking layer 326 between the light-receiving element and the sealing layer 317 can prevent the light-receiving element from being irradiated with light emitted from the light-emitting element 320.

The conductive layer 338 and the conductive layer 339 are electrically connected to the light-receiving element. The conductive layer 338 preferably transmits light incident on the light-receiving element. The conductive layer 339 preferably blocks light incident on the light-receiving element.

It is preferable to provide an optical touch sensor between the organic material layer 302 and the sealing layer 317 because the optical touch sensor is less likely to be affected by light emitted from the light-emitting element 320 and can have improved S/N ratio.

Specific Example 3

Figure 16B:
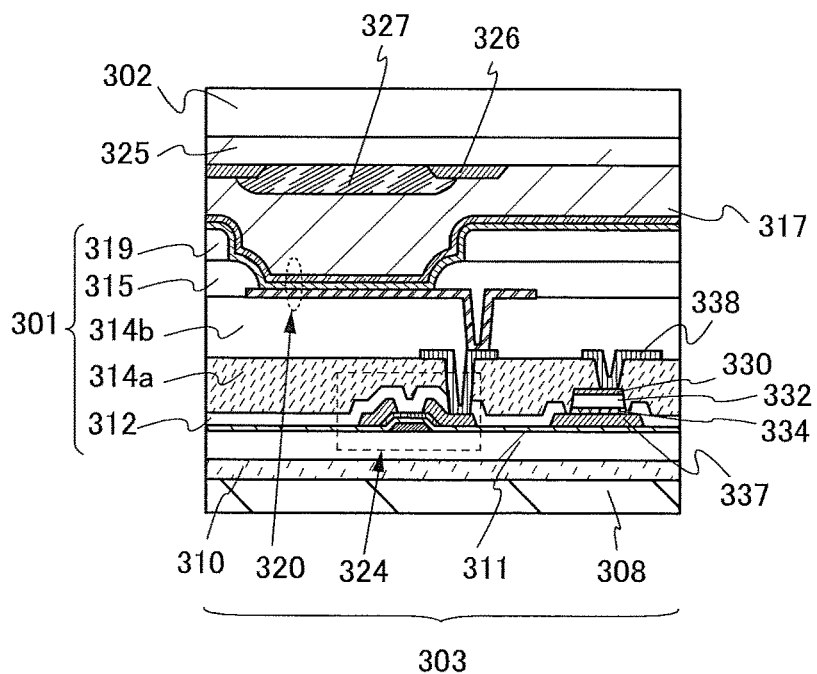

FIG. 16B illustrates another example of the light extraction portion 303 in the light-emitting device. The light-emitting device illustrated in FIG. 16B is capable of touch operation.

The light-emitting device illustrated in FIG. 16B includes an element layer 301, an organic material layer 302, a substrate 308, an adhesive layer 310, a sealing layer 317, an insulating layer 325, a light-blocking layer 326, and a coloring layer 327. The element layer 301 includes an insulating layer 311, an insulating layer 312, an insulating layer 314a, an insulating layer 314b, an insulating layer 315, a spacer 319, a plurality of light-emitting elements including a light-emitting element 320, a plurality of transistors including a transistor 324, a plurality of light-receiving elements, a conductive layer 337, and a conductive layer 338.

FIG. 16B illustrates an example in which a light-receiving element is provided between the insulating layer 311 and the sealing layer 317. Since the light-receiving element is provided between the insulating layer 311 and the sealing layer 317, a conductive layer to which the light-receiving element is electrically connected and a photoelectric conversion layer included in the light-receiving element can be formed using the same materials and the same steps as a conductive layer and a semiconductor layer included in the transistor 324. Thus, the light-emitting device capable of touch operation can be manufactured without a significant increase in the number of manufacturing steps.

Specific Example 4

Figure 17A:
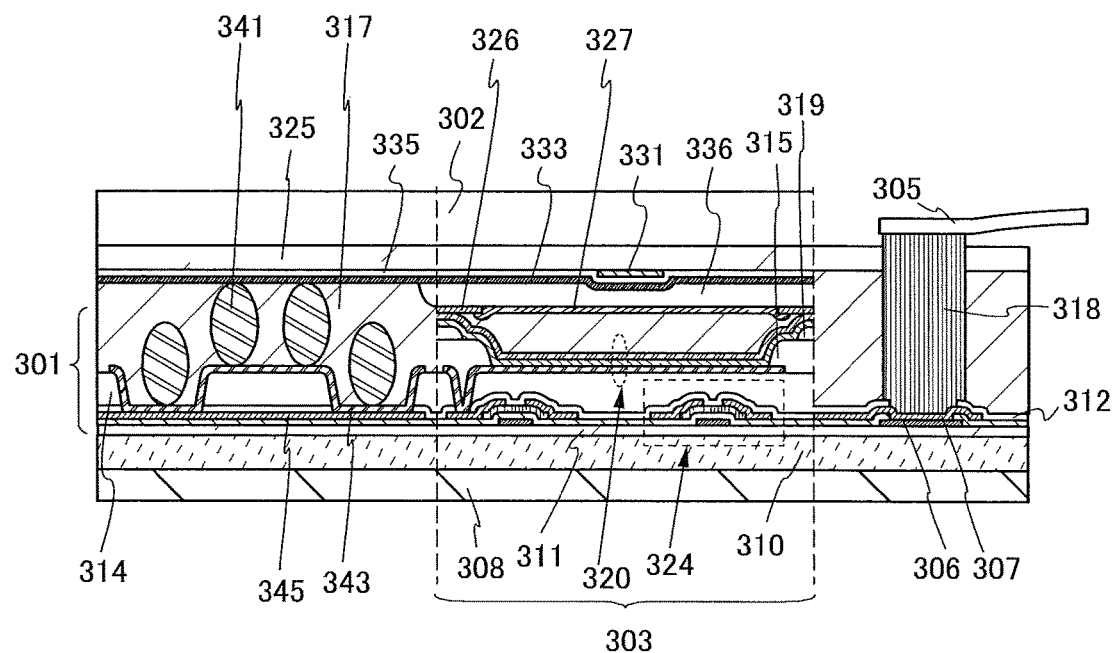
FIGS. 17A and 17B each illustrate an example of a light-emitting device of one embodiment of the present invention.

FIG. 17A illustrates another example of the light-emitting device. The light-emitting device illustrated in FIG. 17A is capable of touch operation.

The light-emitting device illustrated in FIG. 17A includes an element layer 301, an organic material layer 302, a substrate 308, an adhesive layer 310, a sealing layer 317, an insulating layer 325, a light-blocking layer 326, a coloring layer 327, a conductive layer 331, a conductive layer 333, an insulating layer 335, and an insulating layer 336. The element layer 301 includes a conductive layer 306, a conductive layer 307, an insulating layer 311, an insulating layer 312, an insulating layer 314, an insulating layer 315, a spacer 319, a plurality of light-emitting elements including a light-emitting element 320, a plurality of transistors including a transistor 324, a conductive layer 343, and a conductive layer 345.

FIG. 17A illustrates an example in which a capacitive touch sensor is provided between the insulating layer 325 and the sealing layer 317. The capacitive touch sensor includes the conductive layer 331 and the conductive layer 333.

The conductive layer 306 and the conductive layer 307 are electrically connected to a flexible printed circuit 305 via a connector 318. The conductive layer 343 and the conductive layer 345 are electrically connected to the conductive layer 333 via conductive particles 341. Thus, the capacitive touch sensor can be driven via the flexible printed circuit 305.

Specific Example 5

Figure 17B:
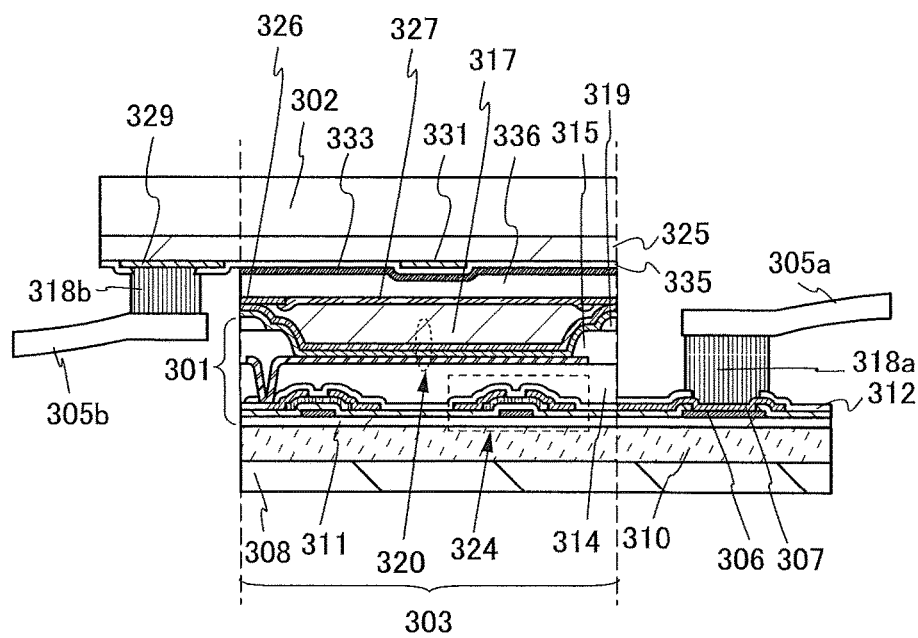

FIG. 17B illustrates another example of the light-emitting device. The light-emitting device illustrated in FIG. 17B is capable of touch operation.

The light-emitting device illustrated in FIG. 17B includes an element layer 301, an organic material layer 302, a substrate 308, an adhesive layer 310, a sealing layer 317, an insulating layer 325, a light-blocking layer 326, a coloring layer 327, a conductive layer 329, a conductive layer 331, a conductive layer 333, an insulating layer 335, and an insulating layer 336. The element layer 301 includes a conductive layer 306, a conductive layer 307, an insulating layer 311, an insulating layer 312, an insulating layer 314, an insulating layer 315, a spacer 319, a plurality of light-emitting elements including a light-emitting element 320, and a plurality of transistors including a transistor 324.

FIG. 17B illustrates an example in which a capacitive touch sensor is provided between the insulating layer 325 and the sealing layer 317. The capacitive touch sensor includes the conductive layer 331 and the conductive layer 333.

The conductive layer 306 and the conductive layer 307 are electrically connected to a flexible printed circuit 305a via a connector 318a. The conductive layer 329 is electrically connected to a flexible printed circuit 305b via a connector 318b. Thus, the light-emitting element 320 and the transistor 324 can be driven via the flexible printed circuit 305a, and the capacitive touch sensor can be driven via the flexible printed circuit 305b.

Specific Example 6

Figure 18A:
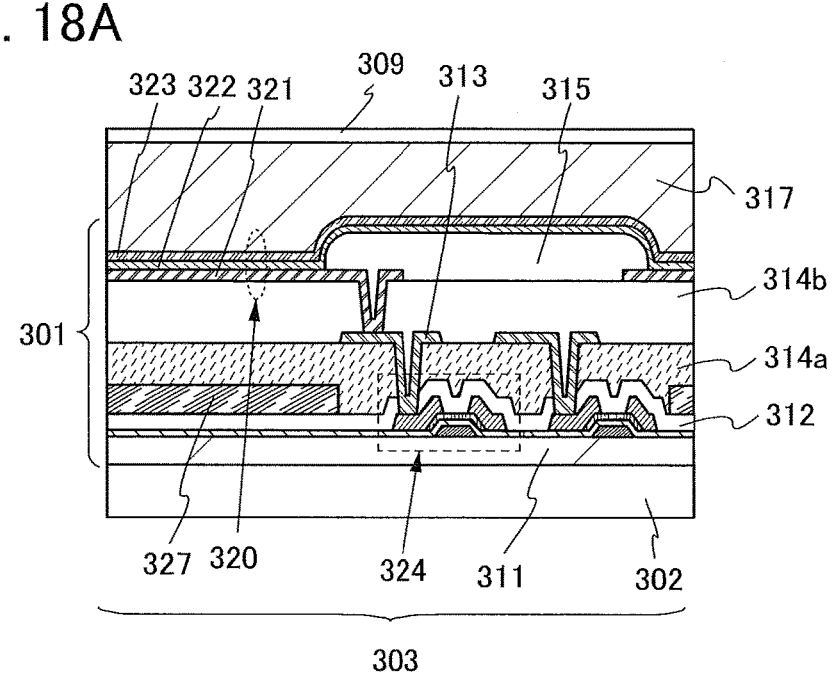
FIGS. 18A and 18B each illustrate an example of a light-emitting device of one embodiment of the present invention.

FIG. 18A illustrates another example of the light extraction portion 303 in the light-emitting device.

The light-extraction portion 303 illustrated in FIG. 18A includes an element layer 301, an organic material layer 302, a substrate 309, and a sealing layer 317. The element layer 301 includes an insulating layer 311, an insulating layer 312, a conductive layer 313, an insulating layer 314a, an insulating layer 314b, an insulating layer 315, a plurality of light-emitting elements including a light-emitting element 320, a plurality of transistors including a transistor 324, and a coloring layer 327.

The light-emitting element 320 includes a lower electrode 321, an EL layer 322, and an upper electrode 323. The lower electrode 321 is electrically connected to a source electrode or a drain electrode of the transistor 324 via the conductive layer 313. An end portion of the lower electrode 321 is covered with the insulating layer 315. The light-emitting element 320 has a bottom emission structure. The lower electrode 321 has a light-transmitting property and transmits light emitted from the EL layer 322.

The coloring layer 327 is provided to overlap with the light-emitting element 320, and light emitted from the light-emitting element 320 is extracted from the organic material layer 302 side through the coloring layer 327. The space between the light-emitting element 320 and the substrate 309 is filled with the sealing layer 317. The substrate 309 can be formed using a material similar to that of the substrate 308.

Specific Example 7

Figure 18B:
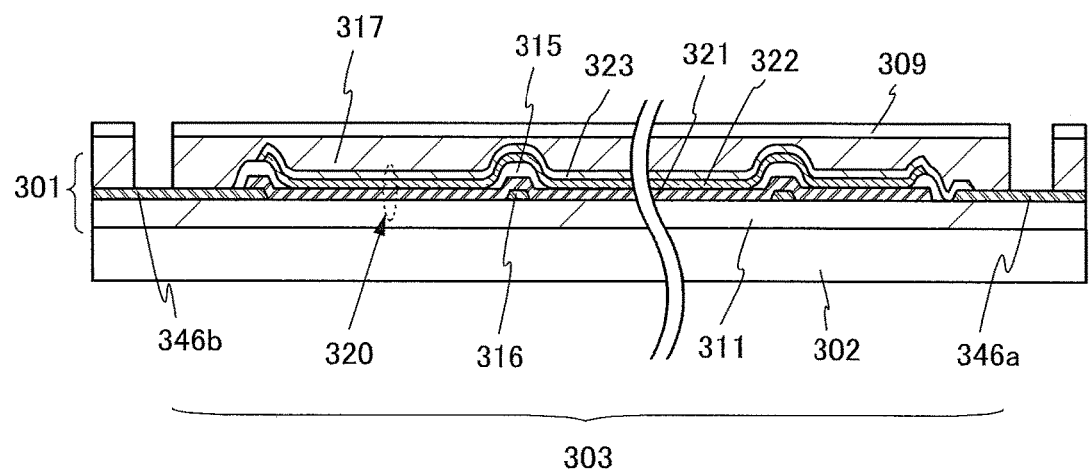

FIG. 18B illustrates another example of the light-emitting device.

The light-emitting device illustrated in FIG. 18B includes an element layer 301, an organic material layer 302, a substrate 309, and a sealing layer 317. The element layer 301 includes an insulating layer 311, an insulating layer 315, a conductive layer 316, a plurality of light-emitting elements including a light-emitting element 320, a conductive layer 346a, and a conductive layer 346b.

The conductive layer 346a and the conductive layer 346b, which are external connection electrodes of the light-emitting device, can each be electrically connected to a flexible printed circuit or the like.

The light-emitting element 320 includes a lower electrode 321, an EL layer 322, and an upper electrode 323. An end portion of the lower electrode 321 is covered with the insulating layer 315. The light-emitting element 320 has a bottom emission structure. The lower electrode 321 has a light-transmitting property and transmits light emitted from the EL layer 322. The conductive layer 316 is electrically connected to the lower electrode 321.

The organic material layer 302 may be bonded to a light extraction structure such as a hemispherical lens, a micro lens array, a film provided with an uneven surface structure, or a light diffusing film. For example, a light extraction structure can be formed by attaching the lens or film to the organic material layer 302 with an adhesive or the like which has substantially the same refractive index as the organic material layer 302 or the lens or film.

The conductive layer 316 is preferably, though not necessarily, provided because voltage drop due to the resistance of the lower electrode 321 can be prevented. In addition, for a similar purpose, a conductive layer electrically connected to the upper electrode 323 may be provided over the insulating layer 315.

The conductive layer 316 can be a single layer or a stacked layer formed using a material selected from copper, titanium, tantalum, tungsten, molybdenum, chromium, neodymium, scandium, nickel, or aluminum, an alloy material containing any of these materials as its main component, or the like. The thickness of the conductive layer 316 can be greater than or equal to 0.1 µm and less than or equal to 3 µm, typically greater than or equal to 0.1 µm and less than or equal to 0.5 µm.

When a paste (e.g., silver paste) is used as a material for the conductive layer electrically connected to the upper electrode 323, metal particles forming the conductive layer aggregate; therefore, the surface of the conductive layer is rough and has many gaps. Thus, even when the conductive layer is formed over the insulating layer 315, for example, it is difficult for the EL layer 322 to completely cover the conductive layer; accordingly, the upper electrode and the conductive layer are electrically connected to each other easily, which is preferable.

Examples of Materials

Next, materials and the like that can be used for a light-emitting device of one embodiment of the present invention are described. Description on the substrate 308, the substrate 309, and the adhesive layer 310 is omitted because the description on the first adhesive layer 204, the second adhesive layer 208, the film substrate 209, and the like in Embodiment 1 can be referred to.

The structure of the transistors in the light-emitting device is not particularly limited. For example, a forward staggered transistor or an inverted staggered transistor may be used. A top-gate transistor or a bottom-gate transistor may be used. A semiconductor material used for the transistors is not particularly limited, and for example, silicon or germanium can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. It is preferable that a semiconductor having crystallinity be used, in which case deterioration of the transistor characteristics can be suppressed.

The light-emitting element included in the light-emitting device includes the lower electrode 321, the upper electrode 323, and the EL layer 322 between the electrodes. One of the lower electrode 321 and the upper electrode 323 functions as an anode and the other functions as a cathode.

The light-emitting element may have any of a top emission structure, a bottom emission structure, and a dual emission structure. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stack of any of the above materials can be used as the conductive film. For example, a stacked film of ITO and an alloy of silver and magnesium is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Further, lanthanum, neodymium, germanium, or the like may be added to the metal material or the alloy. Furthermore, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium can be used for the conductive film. An alloy of silver and copper is preferable because of its high heat resistance. Further, when a metal film or a metal oxide film is stacked on and in contact with an aluminum alloy film, oxidation of the aluminum alloy film can be prevented. Examples of a material for the metal film or the metal oxide film include titanium and titanium oxide. Alternatively, the above conductive film that transmits visible light and a film containing a metal material may be stacked. For example, a stacked film of silver and ITO or a stacked film of an alloy of silver and magnesium and ITO can be used.

Each of the electrodes can be formed by an evaporation method or a sputtering method. Alternatively, a discharging method such as an inkjet method, a printing method such as a screen printing method, or a plating method may be used.

When a voltage higher than the threshold voltage of the light-emitting element is applied between the lower electrode 321 and the upper electrode 323, holes are injected to the EL layer 322 from the anode side and electrons are injected to the EL layer 322 from the cathode side. The injected electrons and holes are recombined in the EL layer 322 and a light-emitting substance contained in the EL layer 322 emits light.

The EL layer 322 includes at least a light-emitting layer. In addition to the light-emitting layer, the EL layer 322 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 322, either a low molecular compound or a high molecular compound can be used, and an inorganic compound may also be used. Each of the layers included in the EL layer 322 can be formed by any of the following methods: an evaporation method (including a vacuum evaporation method), a transfer method, a printing method, an inkjet method, a coating method, and the like.

The insulating layer 311 and the insulating layer 325 can each be formed using an inorganic insulating material. It is particularly preferable to use the insulating film with low water permeability, in which case a highly reliable light-emitting device can be provided.

The insulating layer 312 has an effect of preventing diffusion of impurities into a semiconductor included in the transistor. As the insulating layer 312, an inorganic insulating film such as a silicon oxide film, a silicon oxynitride film, or an aluminum oxide film can be used.

As each of the insulating layers 314, 314a, and 314b, an insulating film with a planarization function is preferably selected in order to reduce surface unevenness due to the transistor or the like. For example, an organic material such as a polyimide resin, an acrylic resin, or a benzocyclobutene-based resin can be used. Other than such organic materials, it is also possible to use a low-dielectric constant material (a low-k material) or the like. Note that a plurality of insulating films formed of these materials or inorganic insulating films may be stacked.

The insulating layer 315 is provided to cover an end portion of the lower electrode 321. In order that the insulating layer 315 be favorably covered with the EL layer 322 and the upper electrode 323 formed thereover, a side wall of the insulating layer 315 preferably has a tilted surface with continuous curvature.

As a material for the insulating layer 315, a resin or an inorganic insulating material can be used. As the resin, for example, a polyimide resin, a polyamide resin, an acrylic resin, a siloxane resin, an epoxy resin, or a phenol resin can be used. In particular, either a negative photosensitive resin or a positive photosensitive resin is preferably used for easy formation of the insulating layer 315.

There is no particular limitation on the method for forming the insulating layer 315; a photolithography method, a sputtering method, an evaporation method, a droplet discharging method (e.g., an inkjet method), a printing method (e.g., a screen printing method or an off-set printing method), or the like may be used.

The spacer 319 can be formed using an inorganic insulating material, an organic insulating material, a metal material, or the like. As the organic insulating material, for example, a negative or positive photosensitive resin, a non-photosensitive resin, or the like can be used. As the metal material, titanium, aluminum, or the like can be used. When a conductive material is used for the spacer 319 and the spacer 319 is electrically connected to the upper electrode 323, voltage drop due to the resistance of the upper electrode 323 can be prevented. The spacer 319 may have either a tapered shape or an inverse tapered shape.

Each of the insulating layers 335, 336, 340, 342, and 344 can be formed using an inorganic insulating material or an organic insulating material. It is particularly preferable to use an insulating layer with a planarization function for each of the insulating layers 336 and 344 in order to reduce surface unevenness due to a sensor element.

For the sealing layer 317, a resin that is curable at room temperature such as a two-component type resin, a light-curable resin, a heat-curable resin, or the like can be used. For example, a polyvinyl chloride (PVC) resin, an acrylic resin, a polyimide resin, an epoxy resin, a silicone resin, a polyvinyl butyral (PVB) resin, an ethylene vinyl acetate (EVA) resin, or the like can be used. A drying agent may be contained in the sealing layer 317. In the case where light emitted from the light-emitting element 320 is extracted outside through the sealing layer 317, the sealing layer 317 preferably includes a filler with a high refractive index or a scattering member. Materials for the drying agent, the filler with a high refractive index, and the scattering member are similar to those that can be used for the adhesive layer 310.

Each of the conductive layers 306, 307, 343, and 345 can be formed using the same material and the same step as a conductive layer included in the transistor or the light-emitting element. The conductive layer 337 can be formed using the same material and the same step as a conductive layer included in the transistor.

For example, each of the conductive layers can be formed to have a single-layer structure or a stacked-layer structure using any of metal materials such as molybdenum, titanium, chromium, tantalum, tungsten, aluminum, copper, neodymium, and scandium, and an alloy material containing any of these elements. Each of the conductive layers may be formed using a conductive metal oxide. As the conductive metal oxide, indium oxide (e.g., $In_2O_3$), tin oxide (e.g., $SnO_2$), zinc oxide (ZnO), ITO, indium zinc oxide (e.g., $In_2O_3$—ZnO), or any of these metal oxide materials in which silicon oxide is contained can be used.

Each of the conductive layers 313, 316, 346a, and 346b can also be formed using any of the above metal materials, alloy materials, and conductive metal oxides.

Each of the conductive layers 331, 333, 338, and 339 is a conductive layer with a light-transmitting property. The conductive layer can be faulted using, for example, indium oxide, ITO, indium zinc oxide, zinc oxide, zinc oxide to which gallium is added, or the like. The conductive layer 329 can be formed using the same material and the same step as the conductive layer 331.

As the conductive particles 341, particles of an organic resin, silica, or the like coated with a metal material are used. It is preferable to use nickel or gold as the metal material because contact resistance can be reduced. It is also preferable to use particles each coated with layers of two or more kinds of metal materials, such as particles coated with nickel and further with gold.

For the connector 318, it is possible to use a paste-like or sheet-like material which is obtained by mixture of metal particles and a heat-curable resin and for which anisotropic electric conductivity is provided by thermocompression bonding. As the metal particles, particles in which two or more kinds of metals are layered, for example, nickel particles coated with gold are preferably used.

The coloring layer 327 is a coloring layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. Each coloring layer is formed in a desired position with any of various materials by a printing method, an inkjet method, an etching method using a photolithography method, or the like.

The light-blocking layer 326 is provided between the adjacent coloring layers 327. The light-blocking layer 326 blocks light emitted from the adjacent light-emitting element, thereby preventing color mixture between adjacent pixels. Here, the coloring layer 327 is provided such that its end portion overlaps with the light-blocking layer 326, whereby light leakage can be reduced. The light-blocking layer 326 can be formed using a material that blocks light emitted from the light-emitting element, for example, a metal material, a resin material including a pigment or a dye, or the like. Note that the light-blocking layer 326 is preferably provided also in a region other than the light extraction portion 303, such as the driver circuit portion. 304, in which case undesired leakage of guided light or the like can be prevented.

The insulating layer 328 covering the coloring layer 327 and the light-blocking layer 326 is preferably provided because it can prevent an impurity such as a pigment included in the coloring layer 327 or the light-blocking layer 326 from diffusing into the light-emitting element or the like. For the insulating layer 328, a light-transmitting material is used, and an inorganic insulating material or an organic insulating material can be used. The insulating film with low water permeability may be used for the insulating layer 328.

This embodiment can be combined with any other embodiment as appropriate.

This application is based on Japanese Patent Application serial no. 2013-097245 filed with Japan Patent Office on May 7, 2013, the entire contents of which are hereby incorporated by reference.

What is claimed is:

1. A separation method comprising the steps of:
    forming a bonded substrate comprising a first substrate, a second substrate, and a separation layer between the first substrate and the second substrate;
    forming a first part and a second part of the second substrate by forming a groove surrounding the first part;
    placing the first part of the second substrate on a first portion of a first surface;
    fixing the bonded substrate to the first surface by a suction force; and
    separating the first part of the second substrate from the first substrate along the separation layer,
    wherein the first surface further comprises a second portion surrounding the first portion,
    wherein a suction force of the first portion is stronger than a suction force of the second portion, and
    wherein the second part of the second substrate remains bonded to the first substrate with the separation layer therebetween when the first part of the second substrate is separated.

2. The separation method according to claim 1, wherein an organic material layer is provided between the second substrate and the separation layer.

3. The separation method according to claim 2, wherein each of the second substrate and the organic material layer comprises a flexible material.

4. The separation method according to claim 1,
    wherein the first portion comprises a plurality of holes, and
    wherein the second portion comprises no holes.

5. The separation method according to claim 1, wherein a depressed portion is provided on a second surface opposite to the first surface.

6. The separation method according to claim 1, wherein the groove surrounds a first part of the separation layer.

7. The separation method according to claim 1, further comprising a step of forming a film substrate over the first part of the second substrate.

8. The separation method according to claim 1,
    wherein the first surface further comprises a third portion,
    wherein the second portion surrounds the third portion, and
    wherein a suction force of the third portion is stronger than the suction force of the second portion.

9. The method according to claim 1, wherein separating the first part of the second substrate is conducted by lifting the first substrate by a hook with a sharp edge inserted in one end of the first substrate.

10. A separation method comprising the steps of:
    forming a bonded substrate comprising a first substrate, a second substrate, and a separation layer between the first substrate and the second substrate;
    forming a first part and a second part of the second substrate by forming a groove surrounding the first part;
    placing the first part of the second substrate on a first portion of a first surface;
    fixing the bonded substrate to the first surface by a suction force; and
    separating the first part of the second substrate from the first substrate along the separation layer,
    wherein the second part of the second substrate remains bonded to the first substrate with the separation layer therebetween when the first part of the second substrate is separated.

11. The separation method according to claim 10, wherein an organic material layer is provided between the second substrate and the separation layer.

12. The separation method according to claim 11, wherein each of the second substrate and the organic material layer comprises a flexible material.

13. The separation method according to claim 10, wherein the first portion comprises a plurality of holes.

14. The separation method according to claim 10, wherein a depressed portion is provided on a second surface opposite to the first surface.

15. The separation method according to claim 10, wherein the groove surrounds a first part of the separation layer.

16. The separation method according to claim 10, further comprising a step of forming a film substrate over the first part of the second substrate.

17. The method according to claim 10, wherein separating the first part of the second substrate is conducted by lifting the first substrate by a hook with a sharp edge inserted in one end of the first substrate.

18. A method for manufacturing a light-emitting device, the method comprising the steps of:
    framing a bonded substrate comprising a first substrate, a second substrate, a separation layer, and an element layer comprising a transistor;
    forming a first part and a second part of the second substrate by forming a groove surrounding the first part;

placing the first part of the second substrate on a first portion of a first surface;

fixing the bonded substrate to the first surface by a suction force; and separating the first part of the second substrate from the first substrate along the separation layer, wherein the separation layer and the element layer are provided between the first substrate and the second substrate, and wherein the second part of the second substrate remains bonded to the first substrate with the separation layer therebetween when the first part of the second substrate is separated.

19. The method according to claim 18, wherein an organic material layer is provided between the second substrate and the separation layer.

20. The method according to claim 19, wherein each of the second substrate and the organic material layer comprises a flexible material.

21. The method according to claim 18, wherein the first portion comprises a plurality of holes.

22. The method according to claim 18, wherein a depressed portion is provided on a second surface opposite to the first surface.

23. The method according to claim 18, wherein the groove surrounds a first part of the separation layer.

24. The method according to claim 18, further comprising a step of forming a film substrate over the first part of the second substrate.

25. The method according to claim 18, wherein separating the first part of the second substrate is conducted by lifting the first substrate by a hook with a sharp edge inserted in one end of the first substrate.

* * * * *